(12) United States Patent
Booth, III et al.

(10) Patent No.: US 7,778,199 B2
(45) Date of Patent: Aug. 17, 2010

(54) TECHNIQUES FOR CUSTOMER SELF-PROVISIONING OF EDGE NODES FOR A VIRTUAL PRIVATE NETWORK

(75) Inventors: Earl Hardin Booth, III, Raleigh, NC (US); William Mark Townsley, Nashville, TN (US); Greg Weber, Knoxville, TN (US); Wei Luo, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1188 days.

(21) Appl. No.: 11/143,551

(22) Filed: Jun. 2, 2005

(65) Prior Publication Data

US 2006/0187855 A1 Aug. 24, 2006

Related U.S. Application Data

(63) Continuation-in-part of application No. 11/142,768, filed on Jun. 1, 2005, now Pat. No. 7,535,856.

(60) Provisional application No. 60/654,661, filed on Feb. 19, 2005.

(51) Int. Cl.
*H04L 12/28* (2006.01)
*G06F 15/177* (2006.01)
*G06F 17/00* (2006.01)
(52) U.S. Cl. .................... 370/254; 709/220; 726/15
(58) Field of Classification Search .................. None
See application file for complete search history.

(56) References Cited

U.S. PATENT DOCUMENTS 5,959,972 A 9/1999 Hamami
6,028,862 A 2/2000 Russell et al.
(Continued)

FOREIGN PATENT DOCUMENTS

CN 101218575 A 11/2005
(Continued)

OTHER PUBLICATIONS

J. Heinanen et al., Using Radius for PE-Based VPN Discovery, Draft-IETF-L2VPN-Radius-PE-Discovery-00.TXT, Feb. 1, 2004, Publisher: IETF.Org, Published in: Internet.
(Continued)

*Primary Examiner*—Pankaj Kumar
*Assistant Examiner*—Marcus R Smith
(74) *Attorney, Agent, or Firm*—Patent Capital Group

(57) ABSTRACT

Techniques for configuring a particular network interface on a particular node at an edge of a provider network to support a particular virtual private network include receiving customer input data. The provider network is a packet-switched network and the particular virtual private network is a link layer virtual private network. The customer input data indicates a topology for customer equipment devices outside the provider network on the particular virtual private network, and may include properties for corresponding interfaces that connect the customer equipment devices to the edge nodes. Based on the customer input data, configuration data is determined for configuring the particular interface at the particular node. The particular node is caused to configure the particular interface based on the configuration data without human intervention. Among other effects, these techniques support zero-touch provisioning of virtual private networks.

55 Claims, 7 Drawing Sheets

U.S. PATENT DOCUMENTS

| | | | |
|---|---|---|---|
| 6,125,119 | A | 9/2000 | Cherukuri et al. |
| 6,381,246 | B1 | 4/2002 | Constantinof et al. |
| 6,549,533 | B1 | 4/2003 | Campbell |
| 6,829,215 | B2 | 12/2004 | Tornar |
| 7,042,988 | B2 * | 5/2006 | Juitt et al. ............... 379/88.17 |
| 7,082,101 | B2 | 7/2006 | Kim et al. |
| 7,124,189 | B2 * | 10/2006 | Summers et al. ............ 709/227 |
| 7,197,550 | B2 | 3/2007 | Cheline et al. |
| 7,340,519 | B1 | 3/2008 | Golan et al. |
| 7,373,661 | B2 * | 5/2008 | Smith et al. ................... 726/15 |
| 7,389,534 | B1 * | 6/2008 | He ............................. 726/15 |
| 7,420,933 | B2 | 9/2008 | Booth, III et al. |
| 7,421,736 | B2 * | 9/2008 | Mukherjee et al. ............ 726/15 |
| 7,469,282 | B2 | 12/2008 | Taylor et al. |
| 7,483,996 | B2 | 1/2009 | Townsley et al. |
| 7,535,856 | B2 | 5/2009 | Booth, III et al. |
| 2001/0026553 | A1 | 10/2001 | Gallant et al. |
| 2003/0041170 | A1 | 2/2003 | Suzuki |
| 2003/0110268 | A1 | 6/2003 | Kermarec et al. |
| 2003/0110276 | A1 | 6/2003 | Riddle |
| 2003/0217126 | A1 | 11/2003 | Polcha et al. |
| 2004/0006708 | A1 | 1/2004 | Mukherjee et al. |
| 2004/0044789 | A1 | 3/2004 | Angel et al. |
| 2004/0052263 | A1 | 3/2004 | Xu |
| 2004/0078621 | A1 | 4/2004 | Talaugon et al. |
| 2004/0156313 | A1 | 8/2004 | Hofmeister et al. |
| 2005/0097203 | A1 | 5/2005 | Unbehagen et al. |
| 2005/0114490 | A1 | 5/2005 | Redlich et al. |
| 2005/0135238 | A1 | 6/2005 | Taylor |
| 2005/0135269 | A1 | 6/2005 | Saint-Hilaire et al. |
| 2005/0193103 | A1 | 9/2005 | Drabik |
| 2005/0213513 | A1 | 9/2005 | Ngo et al. |
| 2006/0018252 | A1 | 1/2006 | Sridhar et al. |
| 2006/0018300 | A1 | 1/2006 | Westberg et al. |
| 2006/0056384 | A1 | 3/2006 | Ishii et al. |
| 2006/0182037 | A1 * | 8/2006 | Chen et al. ................... 370/252 |
| 2006/0187856 | A1 | 8/2006 | Booth, III et al. |
| 2006/0187937 | A1 | 8/2006 | Townsley et al. |
| 2009/0154466 | A1 | 6/2009 | Townsley et al. |

FOREIGN PATENT DOCUMENTS

| | | |
|---|---|---|
| CN | 101099352 A | 2/2006 |
| EP | 0917318 A2 | 5/1999 |
| EP | 1844402 A2 | 10/2007 |
| EP | 1856861 A1 | 11/2007 |
| WO | WO 99-52244 A1 | 10/1999 |
| WO | WO 2006-057849 A2 | 6/2006 |
| WO | WO 2006/089214 | 8/2006 |

OTHER PUBLICATIONS

PCT, "Notification of Transmittal of the International Search Report and the Written Opinion of the International Searching Authority, or the Declaration," for PCT Application No. PCT/US2006/05817, dated Jun. 26, 2006, 8 pages.

J. Heinanen et al., "Using Radius for PE-Based VPN Discovery," draft-ietf-L2VPN-radius-pe-discovery-02.txt; Publisher: IETF.org (Internet), Oct. 2005; 17 pages.

E. Rosen et al., "Provisioning, Autodiscovery, and Signaling in L2VPNs," draft-ietf-L2VPN-signaling-08.txt; Publisher: IETF.org (Internet), May 2006; 37 pages.

L. Martini et al., "Encapsulation Methods for Transport of Ethernet Over MPLS Networks"; www.rfc-editor.org/rfc/rfc4448.txt; Apr. 2006; 23 pages.

G. Gross, et al., PPP Over AAL5, Jul. 1, 1998, Publisher: ietf.org, Published in: Internet, 13 pages.

L Mamakos et al., A Method for Transmitting PPP Over Ethernet (PPPoE), Feb. 1, 1999, Publisher: ietf. org, Published in: Internet, 17 pages.

European Search Report for Application No. PCT/US2005/041225, dated Aug. 5, 2009, 9 pages.

Indian Patent Application Serial No. 1983/DELNP/2007 filed Nov. 15, 2005, entitled "Techniques for Migrating a Point to Point Protocol to a Protocol for an Access Network," Applicant: Cisco Technology, Inc.; 53 pages.

Indian Patent Application Serial No. 4777/DELNP/2007 filed Feb. 17, 2006, entitled "Techniques for for Oversubscribing Nodes for Virtual Private Networks," Applicant: Cisco Technology, Inc.; 80 pages.

PCT, "International Preliminary Report on Patentability and Written Opinion of the International Searching Authority," for Application No. PCT/US2005/041225, dated Oct. 16, 2007, 8 pages.

PCT, "International Preliminary Report on Patentability and Written Opinion of the International Searching Authority," for PCT Application No. PCT/US2006/05817, dated Aug. 21, 2007, 4 pages.

EP, Official Action, Supplementary European Search Report and Annex to European Search Report dated Jul. 27, 2009 (9 pages).

Chinese, The First Office Action, Filing No. 2005800310543, dated Jul. 10, 2009; 13 pages.

Chinese, The First Office Action, Filing No. 2006800017167, dated Oct. 9, 2009; 12 pages.

* cited by examiner

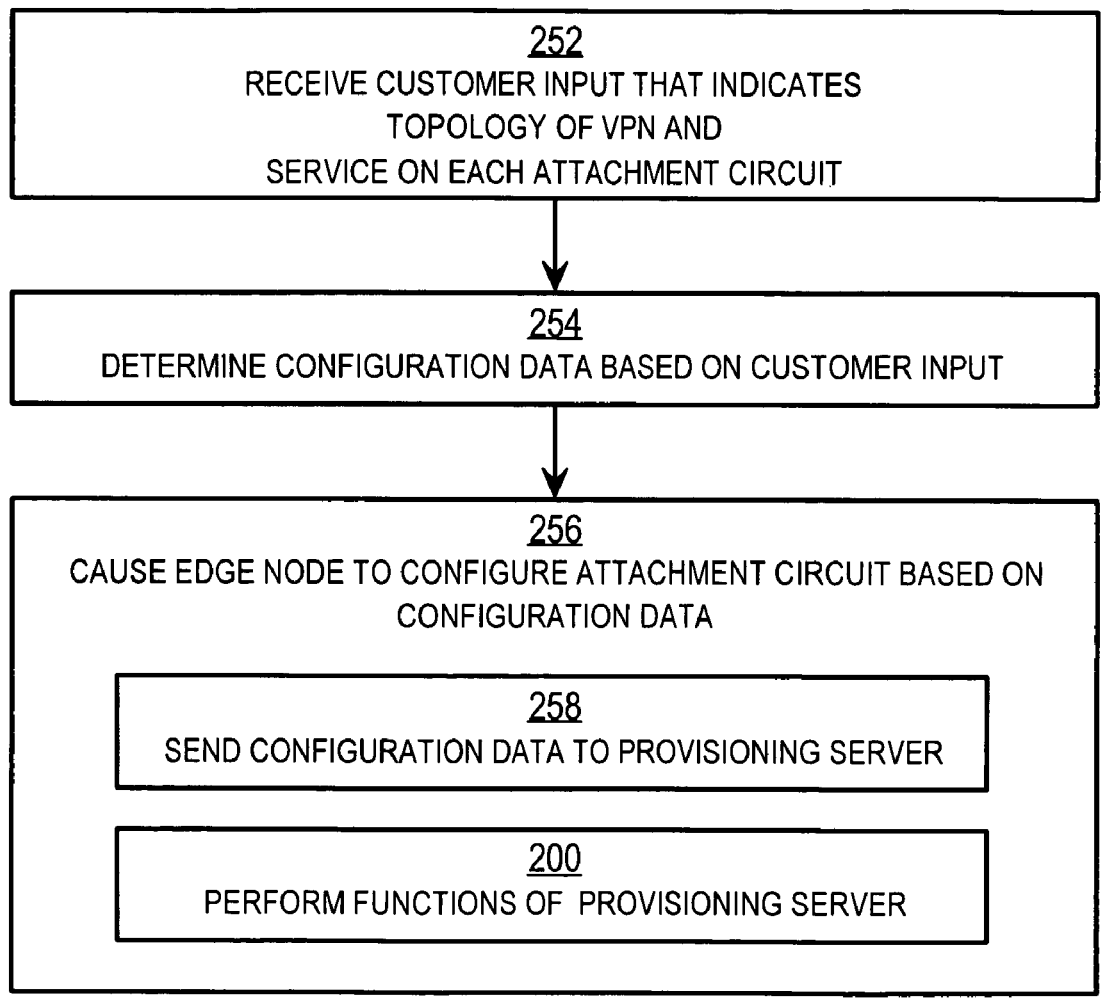

FIG. 3A

300 CUSTOMER EQUIPMENT (CE) ATTACHMENT CIRCUIT (AC) RECORD

| 302 ROUTER ID | 304 AC ID | 306 VC ID | 308 AC SERVICE |

FIG. 3B

320 VPN RECORD FOR PARTICULAR PROVIDER EDGE NODE (PE)

| 302 ROUTER ID | 306 VC ID | 324 OTHER PE LIST |

FIG. 3C

340 PSEUDO WIRE (PW) RECORD

| 302 ROUTER ID | 344 OTHER PE ID | 348 PW PROPERTIES |

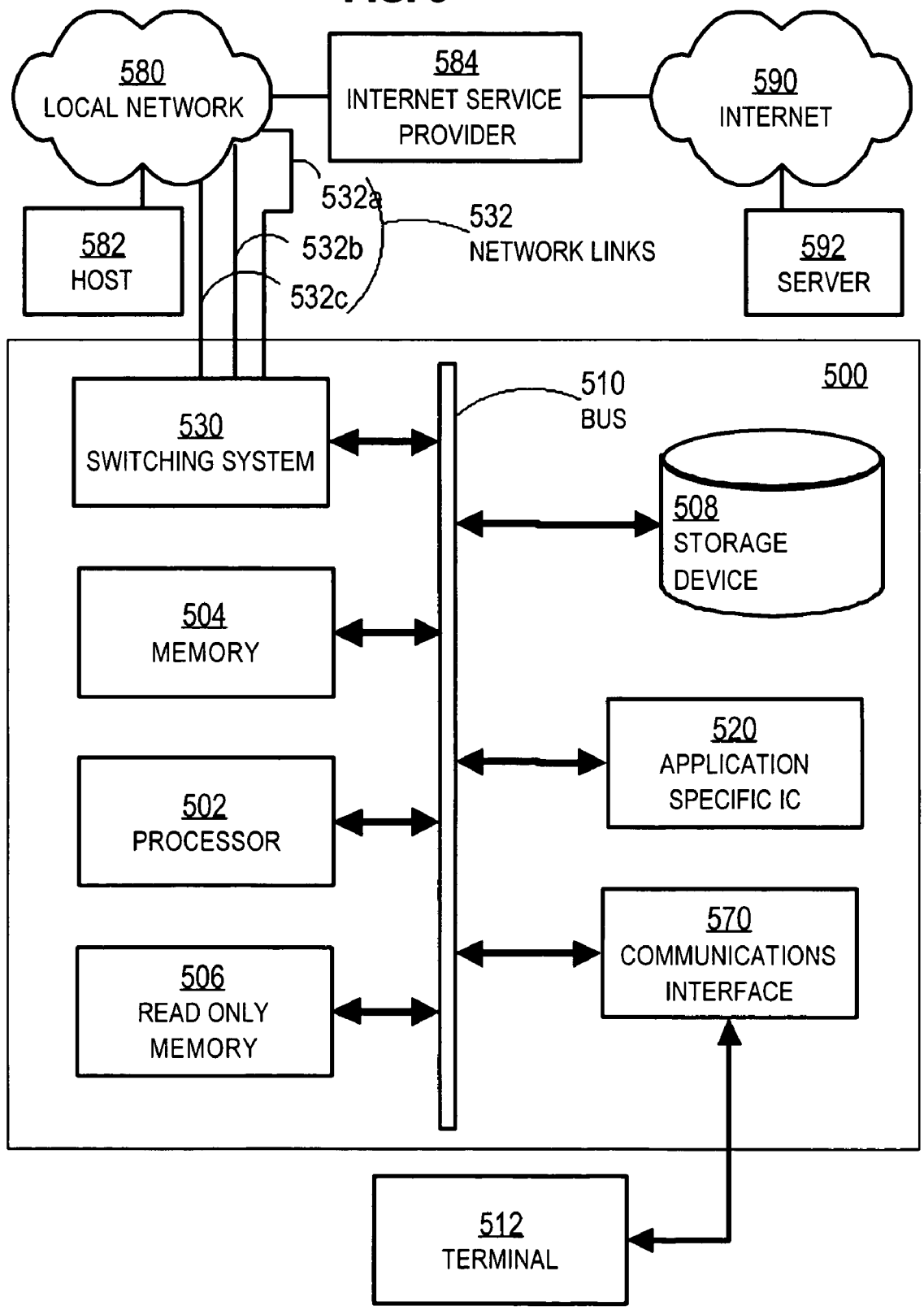

TECHNIQUES FOR CUSTOMER SELF-PROVISIONING OF EDGE NODES FOR A VIRTUAL PRIVATE NETWORK

CROSS-REFERENCE TO RELATED APPLICATIONS

This application claims benefit of Provisional Appln. 60/654,661, filed Feb. 19, 2005, the entire contents of which are hereby incorporated by reference as if fully set forth herein, under 35 U.S.C. §119(e).

This application claims benefit as a Continuation-in-part of application Ser. No. 11/142,768, filed Jun. 1, 2005 (and issued May 19, 2009 as U.S. Pat. No. 7,535,856), entitled "Techniques for Zero Touch Provisioning of Edge Nodes for a Virtual Private Network." the entire contents of which are hereby incorporated by reference as if fully set forth herein, under 35 U.S.C. §120.

BACKGROUND OF THE INVENTION

1. Field of the Invention

The present invention relates to establishing one or more virtual private networks (VPNs) using layer 2 protocols on a packet switching infrastructure that belongs to a trusted service provider; and in particular to configuring each customer interface to a provider edge network node for VPN operation by customer actions without human intervention by the service provider.

2. Description of the Related Art

Networks of general-purpose computer systems connected by external communication links are well known and widely used in commerce. The networks often include one or more network devices that facilitate the passage of information between the computer systems. A network node is a network device or computer system connected by the communication links.

Information is exchanged between network nodes according to one or more of many well known, new or still developing protocols. In this context, a "protocol" consists of a set of rules defining how the nodes interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model. The OSI Reference Model is generally described in more detail in Section 1.1 of the reference book entitled *Interconnections Second Edition*,by Radia Perlman, published September 1999,which is hereby incorporated by reference as though fully set forth herein.

Communications between nodes are typically effected by exchanging discrete packets of data. Each packet typically comprises 1] header information associated with a particular protocol, and 2] payload information that follows the header information and contains information that may be processed independently of that particular protocol. In some protocols, the packet includes 3] trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, usually higher layer of the OSI Reference Model. The header for a particular protocol typically indicates a type for the next protocol contained in its payload. The payload protocol is said to be encapsulated in the header protocol. The headers included in a packet traversing multiple heterogeneous networks, such as the Internet, typically include a physical (layer 1) header, a data-link (layer 2) header, an internetwork (layer 3) header and a transport (layer 4) header, as defined by the Open Systems Interconnection (OSI) Reference Model.

The layer 2 tunneling protocol (L2TP) is a link layer (layer 2) protocol established to provide a persistent virtual circuit as a tunnel between two end nodes of a trusted sub-network. In network parlance, a tunnel for data is simply a protocol that encapsulates that data. The persistent tunnel, or virtual circuit on a packet switched network is often called a pseudo-wire. L2TP facilitates the tunneling of point to point protocol (PPP) packets across an intervening network in a way that is as transparent as possible to both end-users and applications. Using L2TP tunneling, an Internet Service Provider (ISP), or other access service, can create a pseudo wire to link customer's remote sites or remote users with corporate home networks. More recent versions of L2TP facilitates tunneling of a number of data link types, including, but not limited to, Point to Point Protocol (PPP), Frame Relay (FR), Asynchronous Transfer Mode (ATM), High Level Data Link Control (HDLC) and Ethernet. L2TP is described at the time of this writing in Internet Engineering Task Force (IETF) request for comments (RFC) 2661 which can be found in a file named rfc2661.txt, which can be found, along with other RFC files, at the world wide web domain www.ietf org in the file directory named rfc. L2TPv3 is described in RFC 3817 available in file rfc3817.txt in the same directory. The entire contents of RFC .2661 and RFC 3817 are hereby incorporated by reference as if fully set forth herein.

Some protocols follow a layer 2 protocol and precede a layer 3 protocol; and are said to be layer 2.5 protocols. For example, the multi-protocol layer switch (MPLS) is a layer 2.5 protocol that provides for the designation, routing, forwarding and switching of traffic flows through a network and supports the transfer of multiple data link (layer 2) types. MPLS is described at the time of this writing in IETF RFC 3031 and RFC 3032 which can be found in files named rfc3031.txt and rfc3031.tx, the entire contents of each of which are hereby incorporated by reference as if fully set forth herein.

A virtual private network (VPN) is a technology to logically separate the data packets traveling over the same physical network, so that a user of one VPN does not see the data communicated between users of a different VPN. ISPs frequently offer to customers VPNs that are implemented as one or more pseudo wires on a packet switched network (PSN) infrastructure, such as a network of routers using the Internet Protocol (IP) as a layer 3 protocol or using MPLS as a layer 2.5 protocol. A common approach for providing the tunneling functions for a VPN is to use the layer 2 tunneling of L2TPv3 as a payload in IP data packets. In some approaches, a protocol for Any Transport over MPLS (AToM) available from CISCO SYSTEMS™, Inc. of San Jose Calif. is used to support layer 2 tunneling in a payload in MPLS data packets. Then layer 2 protocol data packets, such as PPP, FR, ATM, HDLC, Ethernet are used in these tunnels to transmit customer data for a VPN.

A customer contracts with an ISP to provide a VPN among customer sites and to support certain kinds and amounts of data traffic over that VPN. In response, the ISP configures interfaces to customer equipment on several intermediate network nodes at the edge of an ISP network (so-called "provider edge nodes," or simply "edge nodes," abbreviated hereinafter as "PE"). Each interface is configured to communicate the type of traffic designated for that interface and encapsulate it in one or more tunnels, each tunnel directed to one of one or more other interfaces on other edge nodes of the ISP network. In the parlance of this technology, configuring each affected interface on each affected edge node provisions the VPN.

A PE interface to customer equipment (CE) is called an attachment circuit (AC) or port. Each physical attachment circuit can support one or more logical attachment circuits. For example, a single physical interface for ATM traffic can support multiple ATM virtual circuits, which may be directed to different VPNs; each ATM virtual circuit is considered a different AC to be configured. Configuration data specifies values for one or more parameters for each attachment circuit (AC). The parameters and values depend on the layer 2 protocol to be supported in the VPN, the topology of the VPN, and the tunneling protocol used to establish the pseudo wires. Example configuration data for a logical ATM AC specifies a percentage of total bandwidth devoted to the logical AC, a cell-packing value, the other PE devices in the topology, and a control plane protocol to establish and maintain pseudo wires among the connected PE.

Currently, provisioning the VPN is a manual process, in which a network administrator determines which data packets on each interface are sent out on which link to the provider network using which designations to be recognized by subsequent intermediate nodes and edge node as a separate tunnel. The manual provisioning process is tedious and error prone. Furthermore, when a new piece of customer equipment is connected to an edge node, that equipment is unable to communicate over the VPN unless and until the human administrator provisions the VPN to add the new interface. Thus the process is subject to delays. The delays grow in severity as the human administrator becomes busier. The tedium and propensity for error increase with the complexity of the VPN topology (e.g., as the numbers of interfaces and edge nodes increase).

Based on the foregoing description, there is a clear need for techniques to provision a VPN on a provider's network without the deficiencies of prior art approaches. In particular, there is a clear need for techniques to provision a VPN on a provider's network without human intervention by the service provider whenever a new VPN is established or a new attachment circuit or provider edge node is added to or removed from the VPN.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2A is a flow diagram that illustrates at a high level a method for provisioning a virtual private network at a subscription server, according to an embodiment;

FIG. 3A is a block diagram that illustrates a customer interface record on a provisioning server, according to an embodiment;

FIG. 3B is a block diagram that illustrates a VPN record on a provisioning server, according to an embodiment;

FIG. 3C is a block diagram that illustrates a pseudo wire record on a provisioning server, according to an embodiment;

FIG. 5 is a block diagram that illustrates a computer system upon which an embodiment of the invention may be implemented.

DETAILED DESCRIPTION

A method and apparatus are described for zero touch provisioning of edge nodes for virtual private networks. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Certain embodiments of the invention are described in the context of a subscription server on one host and a provisioning server on another host of a provider network away from the provider edge, which provision a single, layer-two virtual private network (VPN) on an Internet Protocol (IP) infrastructure for a single customer; but the invention is not limited to this context. In other embodiments, one or more servers on hosts at or away from the provider edge provision one or more layer-two VPNs for one or more customers using one or more protocols on a packet switching network based on one or more protocols above layer 2, such as IP and multi-protocol layer switch (MPLS) protocol. For example, in the following description, subscription server and provisioning server are separate servers. In some other embodiments, a single server performs functions of both the subscription server and the provisioning server. In yet other embodiments two or more different servers divide the functions of the described subscription and provisioning servers differently.

The client-server model of computer process interaction is widely known and used in commerce. According to the client-server model, a client process sends a message including a request to a server process, and the server process responds by providing a service. The server process may also return a message with a response to the client process. Often the client process and server process execute on different computer devices, called hosts, and communicate via a network using one or more protocols for network communications. The term "server" is conventionally used to refer to the process that provides the service, or the host computer on which the process operates. Similarly, the term "client" is conventionally used to refer to the process that makes the request, or the host computer on which the process operates. As used herein, the terms "client" and "server" refer to the processes, rather than the host computers, unless otherwise clear from the context. In addition, the process performed by a server can be broken up to run as multiple servers on multiple hosts (sometimes called tiers) for reasons that include reliability, scalability, and redundancy, but not limited to those reasons.

1.0 Example Virtual Private Network

Figure 1A:
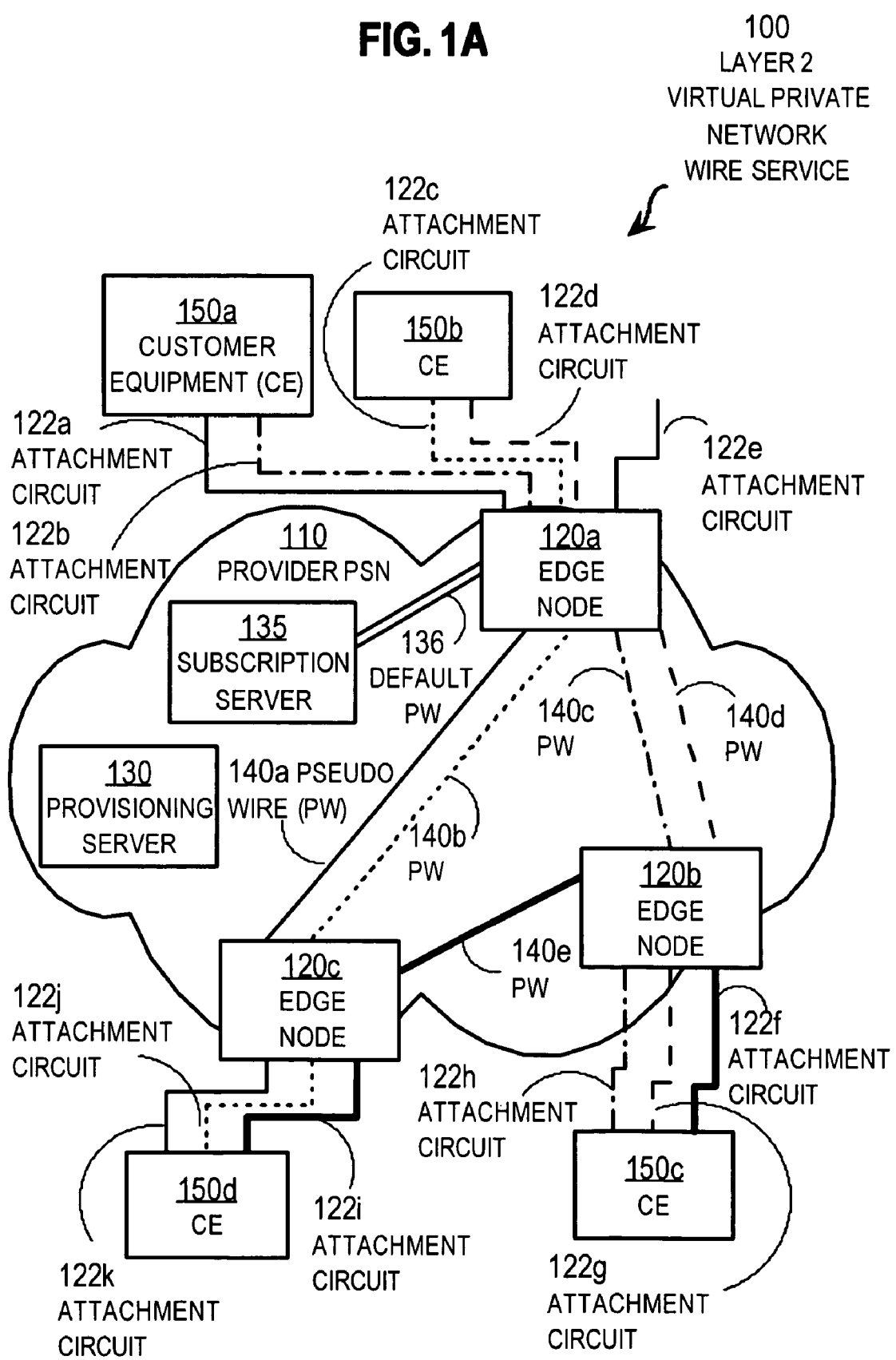
FIG. 1A is a block diagram that illustrates a virtual private network on a provider packet-switched network for a virtual private wire service, according to an embodiment.

FIG. 1A is a block diagram that illustrates a virtual private network 100 based on a virtual private wire service (VPWS) on a provider packet-switched network (PSN) 110, according to an embodiment. The provider PSN 110 includes two or more edge nodes, e.g., PE 120a, 120b, 120c (collectively referenced hereinafter as PE 120). Each PE 120 includes one or more physical interfaces to which customer premises equipment (CE) may be connected. The physical interfaces support one or more physical or logical attachment circuits (ACs) used by the customer to communicate over network 110. For example, PE 120a includes ACs 122a, 122b, 122c, 122d, 122e. CE 150a is connected to PE 120a through ACs 122a, 122b; and CE 150b is connected to PE 120a through ACs 122c, 122d. AC 122e is available for connecting to CE, but no CE is currently connected. Similarly, CE 150c is connected to PE 120b through ACs 122f, 122g, 122h. CE 150d is connected to PE 120c through ACs 122i, 122j, 122k. The CEs 150a, 150b, 150c, 150d are collectively referenced hereinafter as CEs 150. The ACs 122a, 122b, 122c, 122d, 122e, 122f, 122g, 122h, 122i, 122j, 122k are collectively referenced hereinafter as ACs 122. Also shown are provisioning server 130 and subscription server 135 on PSN 110, described in more detail below.

VPN 100 includes multiple tunnels between pairs of PEs. Each such tunnel is called a virtual circuit or pseudo wire (PW). FIG. 1A depicts five PWs 140a, 140b, 140c, 140d, 140e (collectively referenced hereinafter as PWs 140) used to provide VPWS for point to point traffic among CEs 150. Point-to-point data packet traffic between CE 150a and CE 150d is carried by AC 122a and PW 140a and AC 122k. Point-to-point data packet traffic between CE 150b and CE 150d is carried by AC 122c and PW 140b and AC 122j. Similarly, point-to-point data packet traffic between CE 150a and CE 150c is carried by AC 122b and PW 140c and AC 122h; and such data packet traffic between CE 150b and CE 150c is carried by AC 122d and PW 140d and AC 122g. Point-to-point data packet traffic between CE 150c and CE 150d is carried by AC 122f and PW 140e and AC 122i. In some embodiments, one or more ACs 122 are logical ACs that share the same physical wire; e.g., ACs 122a, 122b are logical ACs that share the same physical transmission medium from edge node 120a to CE 150a. For example, FR, ATM and Ethernet virtual local area networks (VLANs) are attachment circuits which allow multiple customers (or services) to be transported on the same physical wire.

This complete collection of PWs in FIG. 1A is called a full mesh. In some circumstances, such a full mesh involves more PWs and associated costs than are needed. For example, if customer needs are satisfied so long as CE 150d has a PW to CE 150b and CE 150c has a PW to CE 150a, then only two PWs are needed, e.g., 140a and 140c, with fewer associated attachment circuits including only 122j, 122c and 122h, 122b.

According to some embodiments of the invention described in more detail below, one or more edge nodes are configured to switch data packet traffic with one or more attachment circuits through a default pseudo wire to the subscription server, at least temporarily. In the illustrated embodiment, one or more attachment circuits 122 on edge node 120a are switched through a default PW 136 to subscription server 135 until those attachment circuits 122 are configured to join a VPN, e.g. VPN 100.

Figure 1B:
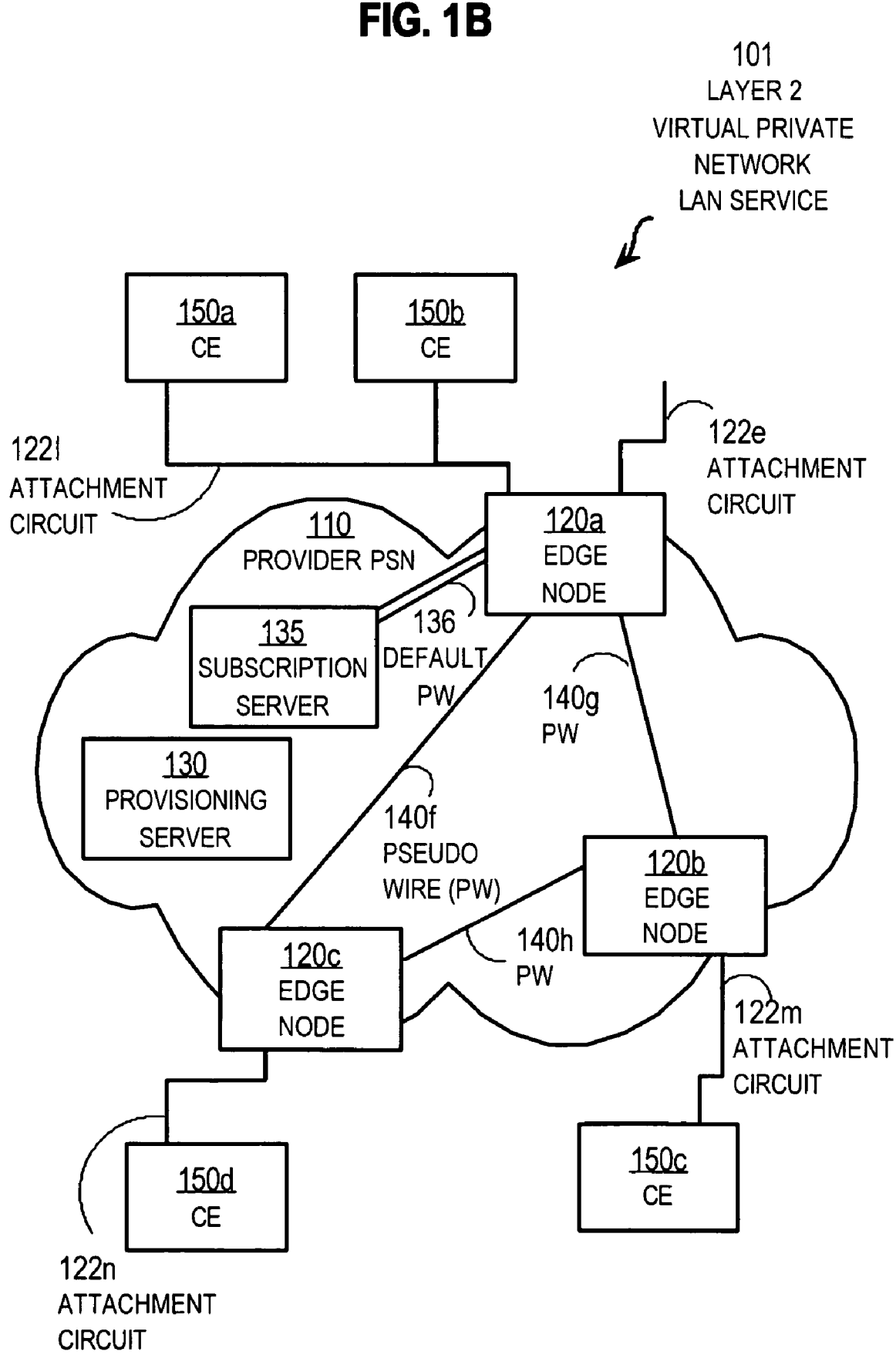
FIG. 1B is a block diagram that illustrates a virtual private network on a provider packet-switched network for a virtual private LAN service, according to an embodiment.

In some VPN service, called a virtual private local-area network (LAN) service (VPLS) every CE is connected to every other CE on the VPN and data traffic flows to them all as if on an Ethernet LAN. FIG. 1B is a block diagram that illustrates a virtual private network 101 on a provider packet-switched network 110 for VPLS, according to an embodiment. For example, VPN 101 includes sufficient PWs 140f, 140g, 140h to connect each PE 120a, 120b, 120c to the others. Traffic between different CEs on the VLAN is not distinguished by separate ACs and separate PWs. Thus, CEs 150a, 150b are on the same LAN, which forms AC 122 1, and traffic from both is carried to CE 150c via a single PW 140g to PE 120b and thence via a single AC 122m. Similarly traffic from both is carried to CE 150d via a single PW 140f to PE 120c and thence via a single AC 122n. Inactive AC 122e is kept separate for use in a different VPLS or VPWS VPN. Clearly, the provisioning of PSN 110 is different for the different VPNs 100 and 101, even though both involve the same PEs and CEs.

2.0 Method at Customer Server for Provisioning a VPN

According to various embodiments of the invention, one or more subscription servers on the provider network receive customer input and derive configuration data to provision, without further human intervention, one or more VPNs. For example, subscription server 135 receives customer input and derives configuration data. In the illustrated embodiment, provisioning server 130 stores and sends configuration data to PE 120a to switch traffic for AC 122a with PW 140a, AC 122b with PW 140c, AC 122c with PW 140b, and AC 122d with PW 140d. Similarly, provisioning server 130 stores and sends configuration data to PE 120b and PE 120c. Even with the relatively simple topology of FIG. 1A, the danger of errors during manual configuration is high.

According to some embodiments, subscription server 135 also determines configuration data for unused AC 122e and sends that data to provisioning server 130 for storage and use. When a new CE (not shown) or service is connected to AC 122e, provisioning server 130 sends the configuration data to PE 120a and causes new PWs (not shown) to be formed with PE 120b or PE 120c or both. Similarly, server 130 sends configuration data to PEs 120b, 120c that cause those PEs to switch the new PWs with new ACs (not shown) on PEs 120b, 120c. Thus server 130 provisions VPN 100 without human intervention. If AC 122e joins VPN 101, instead of joining VPN 100, then server 130 causes PE 120a to merge AC 122e with LAN AC 1224 and sends traffic from AC 122e over both extant PWs 140a, 140c.

Figure 2B:
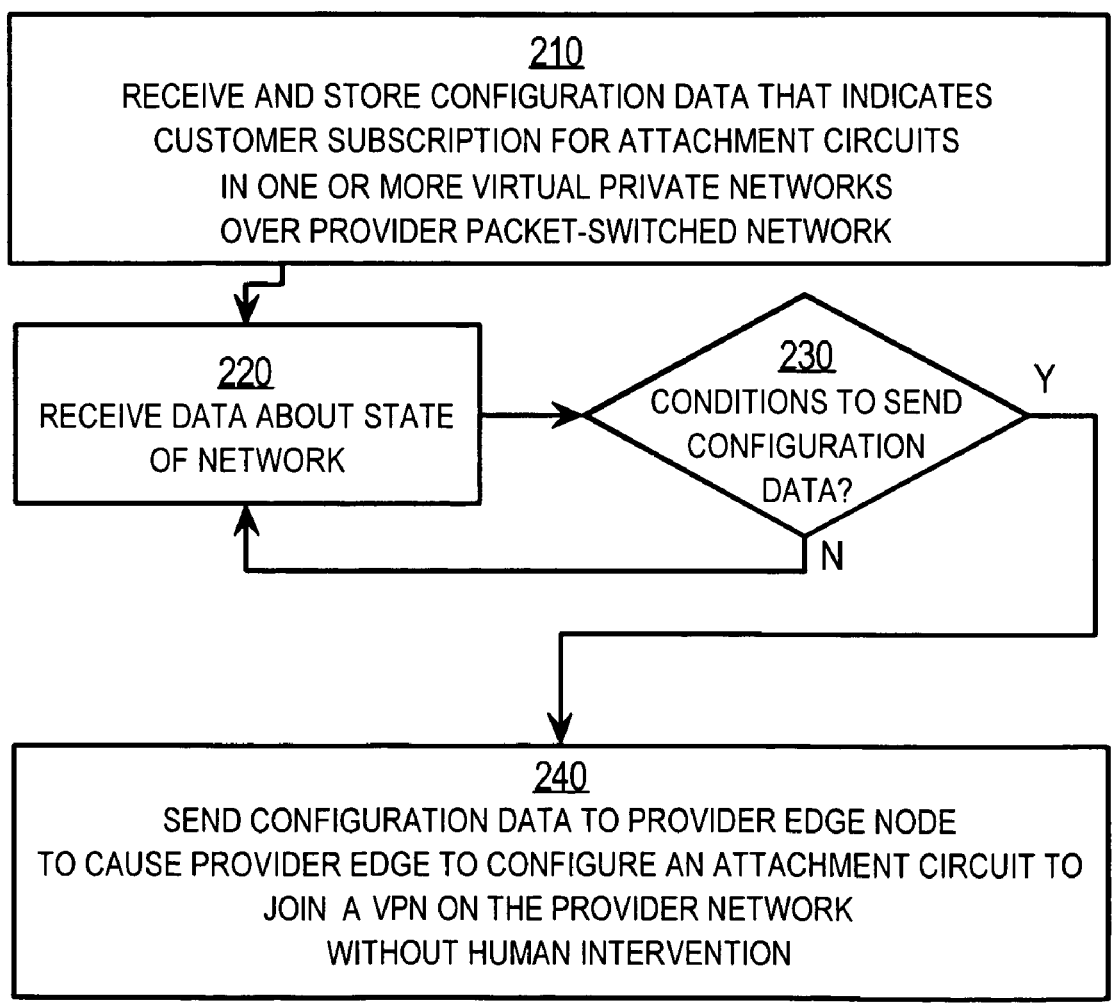
FIG. 2B is a flow diagram that illustrates at a high level a method for provisioning a virtual private network at a provisioning server, according to an embodiment.

FIG. 2A is a flow diagram that illustrates at a high level a method 250 for provisioning a virtual private network at a subscription server distinct from a provider edge node, according to an embodiment. Although steps are shown in FIG. 2A and subsequent flow diagrams (e.g., FIG. 2B and FIG. 4) in a particular order for purposes of illustration, in other embodiments one or more steps may be performed in a different order or overlapping in time or omitted, or changed in some combination of ways.

In step 252, customer input is received that indicates a topology for a VPN and a level of service on each attachment circuit. This input specifies the service to which the customer intends to subscribe. In some embodiments only topology information is received and service level is based on default values.

The topology information indicates the location of customer premises equipment or attachment circuits on each customer premises equipment to be connected in the VPN, or both. In some embodiments, the topology information also indicates the type of VPN service, e.g., whether VPLS or VPWS or IPLS or some other service. In some embodiments, the topology information also indicates an identifier for the VPN. In some embodiments, e.g., those choosing VPWS, the topology information also indicates the mapping of an attachment circuit on one customer premises equipment to an attachment circuit on another piece of equipment. In some embodiments, default values are implicitly received for any topology information that is not explicitly received.

The level of service information indicates for each attachment circuit, the physical media, a link layer (layer 2) protocol used on the attachment circuit, a virtual circuit identifier, a minimum bandwidth, a maximum jitter, a maximum latency, or one or more other properties, or some combination. In some embodiments, default values are implicitly received for any level of service information that is not explicitly received.

In some embodiments, step 252 includes receiving customer authentication, billing and authorization information. For example, in some embodiments, information is received from the customer during step 252 that gives customer credit card information or purchase order information or other information used by the provider to extract payment from the customer. In some embodiments, step 252 includes receiving user identifiers and passwords for users who may access the VPN.

Any method may be used to receive this data. In some embodiments, the customer input is input manually to the subscription server by an agent of the customer and stored locally or on a remote node. In some embodiments, the customer input is input manually to a remote agent and forwarded to the subscription server. In some embodiments, the customer input is input manually to a text editor according to an agreed format and stored in one or more files that are sent to the subscription server. For example, in some embodiments, customer input is input using an extensible markup language (XML) editor and sent as an XML file. In some embodiments, the data is retrieved as a file, such as an XML file, from storage locally or remotely. In some embodiments, the data is sent in a message from another node on the network either in response to a message from the subscription server or in an unsolicited message. In some embodiments a combination of different methods is used.

In some example embodiments, the subscription server 135 is a server on the World Wide Web, which exchanges messages with a World Wide Web client (called a Web browser) using the HyperText Transfer Protocol (HTTP), an application layer (layer 7) protocol. In some of these embodiments, the Web server is available to the public with an address on the public Internet. In response to being contacted by the customer's Web browser, the Web server sends messages with scripts (such as JAVA forms) that prompt the customer for specific input, receives the customer response, and returns the response to the Web server.

In some embodiments, described in more detail below with reference to FIG. 4, the subscription server 135 is a server on the provider network, as depicted in FIG. 1A and FIG. 1B. One or more attachment circuits on one or more edge nodes are initially configured as captive portals, well known in the art, or similar constructs using other protocols that tunnel all traffic to the server 135. A captive portal technique forces an HTTP client on a network (e.g., on CE 150) to see a special web page (e.g., a page generated by subscription server 135) before using the Internet normally. This is done by intercepting all HTTP traffic, regardless of address, until the user is allowed to exit the portal. The use of captive portals is common at the time of this writing for authenticating a user, such as a user of a wireless network card or other public access network ports. But the use of captive portals on attachment circuits to provider edge nodes prior to VPN configuration is not known to applicants.

For example, all attachment circuits (122a, 122b, 122c, 122d, 122e) are initially switched to server 135, as indicated by default PW 136. Messages are exchanged between a web-based subscription server 135 and a web browser on customer premises equipment (e.g., 150a, 150b) that prompt the customer for the information to be received during step 252. In response, the subscription server 135 receives the customer input. In other embodiments other techniques similar to captive portals for HTTP traffic are used for other application layer protocols.

Any customer input relevant to forming configuration data for configuring a provider edge node without further human intervention by the provider may be used. For purposes of illustration, it is assumed that the information listed in Table 1 is obtained during step 252. The customer input is described in Table 1 as if values are obtained for certain input fields. The input fields may be presented to a customer in any manner known in the art, such as text fields in a form in a computer display window, as pull down menus, as buttons, as attributes in an XML document, or as some combination. In other embodiments, some input fields are split into several different input fields, or some input fields that are different in Table 1 are combined into a single input field, or both.

In the illustrated example, it is assumed that the customer wants to establish a VPWS VPN, like VPN 100, for its sales department with CE 150a and CE 150b serving as hubs that represent a network segment for a main computer and a separate network segment for a backup computer at corporate headquarters. The spokes for each hub are CEs 150c, 150d in stores at two different locations, one at a store location in Ourtown separate from corporate headquarters and a second in a different city name Twotown. Table 1 shows customer names for the VPWS VPN and for the CEs 150a, 150b, 150c, 150d. Table 1 also shows customer names and non-default properties for individual attachment circuits between the first hub and the first spoke (e.g., attachment circuit 122b on CE 150a directed to attachment circuit 122h on CE 150c). It is assumed for purposes of illustration that individual attachment circuits are ATM virtual circuits identified by their virtual path ID (VPI) and virtual channel ID (VCI), as is well known in the art. These IDs are indicated in Table 1 by the values "2" and "34" separated by a period.

TABLE 1

Example customer input information for VPWS

| input field name | description | sample values |
|---|---|---|
| customer | identifier for customer | CorpABC |
| address | Billing address | 1234 Main Street, Suite 1000 Ourtown, OH 99999-9999 |
| payment | payment authorization | purchase order #; credit card info |
| contact | person who represents customer | Jane Smith, President, 800-555-1234 |
| VPN ID | customer identifier for VPN | Sales Dept |
| VPN type | whether VPWS, VPLS or other | VPWS |
| Hubs | customer identifiers for customer equipment serving as hubs | main, bkup |
| loc(1) | location of first hub | 1234 Main Street, Suite 1000 Ourtown, OH 99999-9999 |
| Spokes of 1st Hub | customer identifiers for customer equipment serving as spokes for one hub | Twotown, Ourtown |

TABLE 1-continued

Example customer input information for VPWS

| input field name | description | sample values |
|---|---|---|
| loc(1,1) | location of first spoke for first hub | 9876D First Street, Twotown, KY 88888-8888 |
| numAC(1,1) | number of attachment circuits from first hub to first spoke | 1 |
| Media(1,1,1) | media type for first attachment circuit from first hub to first spoke | ATM |
| ACname(1,1,1) | name of first attachment circuit from first hub to first spoke | 2.34 |
| ACprop(1,1,1,1) | property name-value pair for first non-default property of first attachment circuit from first hub to first spoke | level.silver |
| ... | ... | ... |

It is assumed for purposes of illustration that a service level of bronze is the default service level over the provider network, and that the customer can specify a higher level of service. In Table 1,the customer specifies a silver level of service over the provider network 110. The last row in Table 1 contains ellipses to indicate further customer input is obtained to complete the information used to construct configuration data. For example, inputs for other non-default properties for the first attachment circuit and information for other attachment circuits from the first or second hub to the same or different spokes are entered where Table 1 shows the ellipses.

It is here noted that the customer input information does not specify anything about the provider equipment. For example, the customer input information does not specify provider edge nodes PE 120*a*, 120*b*, 120*c*, nor pseudo wires PW 140*a* through PW 140*e*.

The customer input for a VPLS is much simpler and is illustrated in Table 2. Individual attachment circuits and their properties need not be specified.

TABLE 2

Example customer input information for VPLS

| input field name | description | sample values |
|---|---|---|
| customer | identifier for customer | CorpABC |
| address | Billing address | 1234 Main Street, Suite 1000 Ourtown, OH 99999-9999 |
| payment | payment authorization | purchase order #; credit card info |
| contact | person who represents customer | Jane Smith, President, 800-555-1234 |
| VPN ID | customer identifier for VPN | Voice intercom |
| VPN type | whether VPWS, VPLS or other | VPLS |
| Nodes | customer identifiers for customer equipment serving as nodes | main, bkup, Twotown, Ourtown |
| Media | media type for attachment circuits | Ethernet |
| loc(1) | location of first node | 1234 Main Street, Suite 1000 Ourtown, OH 99999-9999 |
| ... | ... | ... |

In step 254, configuration data is determined based on the customer input information. For example, the provider edge nodes nearest the locations of the customer premises equipment are determined and identified based on the customer input for locations of the customer premises equipment. One or more physical interfaces on the provider edge nodes consistent with the customer identified media type are determined and associated with the customer based on the customer input for the media type. A list of provider edge nodes to be connected by pseudo wires to another provider edge node is determined based on the customer input data for VPN service type. For example, based on the VPN type "VPLS" in Table 2,configuration data is determined that lists all three provider edge nodes to be connected by a full mesh of shared pseudo wires. Alternatively, based on the VPN type "VPWS" and the list of individual attachment circuits in Table 1,configuration data is determined that maps the provider edge node of each attachment circuit to a remote provider edge node and attachment circuit. Each different pseudo wire is given a name generated during step 254. The properties of each pseudo wire that connects a pair of provider edge nodes are determined based on the default properties for pseudo wires and any non-default properties specified in the customer input.

In step 256, the subscription server causes one or more edge nodes to configure one or more attachment circuits to join a VPN. In some embodiments, step 256 is performed immediately by sending configuration data to all provider edge nodes immediately. In some embodiments, step 256 is performed on fewer than all attachment circuits at a time, as certain conditions are satisfied. For example, in some embodiments step 256 includes step 258. In step 258 the configuration data is sent to a separate provisioning server that stores the configuration data and tests network conditions. When certain conditions are satisfied, then the provisioning server sends configuration data to one or more provider edge nodes with attachment circuits implicated by the activity. The process performed at a provisioning server is described in more detail bellow with reference to FIG. 2B. In some embodiments, step 256 includes step 200. In step 200 the subscription server performs the functions of the provisioning server. For example, the subscription server stores the configuration data and tests network conditions as described in more detail bellow with reference to FIG. 2B. When certain conditions are satisfied, then the subscription server sends configuration data to one or more provider edge nodes with attachment circuits implicated by the activity.

There are several advantages of the method 250 compared to the prior art practice. One obvious advantage is that a human administrator for the VPN service provider is not required at any step of the provisioning process.

3.0 Data Structures for Configuration Data

In an illustrated embodiment, step 256 includes storing the configuration data in one or more data structures. Example configuration data and example data structures to store the configuration date are described in more detail below with reference to FIG. 3A, FIG. 3B and FIG. 3C. In other embodiments fewer, or more, or different data structures store the same or different configuration data. In some embodiments, the provisioning server 130 uses the RADIUS protocol, and the subscription server sends configuration data to the provisioning server in RADIUS messages. In some embodiments, the provisioning server is a RADIUS server.

FIG. 3A is a block diagram that illustrates a customer interface record 300, according to an embodiment. In the illustrated embodiment, the record 300 includes four fields, a router identification (Router ID) field 302, an attachment circuit identification (AC ID) field 304, a network virtual circuit (VC) identification (VC ID) field 306, and an attachment circuit (AC) service field 308.

The Router ID field 302 holds data that uniquely indicates a provider edge node that is to receive the configuration data. The value of the Router ID field 302 serves as an index to a particular record in the data stored. In an illustrated embodiment, the value of the Router ID field is the IP address of the provider edge node on the provider network. An IP address is four octets that are commonly designated by four decimal values separate by three dots, where each decimal value falls between 0 and 255,inclusive. For purposes of illustration, it is assumed that PEs 120a, 120b, 120c have IP addresses 1.1.1.1, 1.1.1.2 and 1.1.1.3,respectively. For some embodiments in which the configuration data is stored on the corresponding provider edge node, the router ID field 302 is omitted. Thus, in some embodiments, the Router ID field 302 holds the IP address of the provider edge node (e.g., PE120a) to be configured. In some embodiments, the Router ID field holds other data, such as text, that uniquely identifies the provider edge node (e.g., PE 120a) in the provider network, or any kind of network address, such as a VPNv4 IP address or an IPv6 address.

The AC ID field 304 holds data that indicates a physical or logical attachment circuit on a provider edge node that is a member of a VPN. The value of the AC ID field 304 serves as a secondary index to a particular record in the configuration data stored, e.g. on the provisioning server 130. The AC ID field serves as the primary index to a particular record in the configuration data stored on the corresponding provider edge node. Any method may be used to indicate the attachment circuit. In one embodiment, the AC ID field 304 holds data that uniquely indicates physical links on the router identified in Router ID field 302, such as some combination of the physical port ID and a virtual circuit ID. For example, a certain class of routers internally numbers the physical interfaces on each router from 0 through N, where N is the number of physical interfaces, and 0 refers to the router itself. In some embodiments the physical interfaces are named in software. In some embodiments, the AC is uniquely indicated by an arbitrary value (e.g., a name or number).

In some embodiments, the AC ID is based on a logical attachment circuit, such as a frame relay or ATM virtual circuit name or VLAN tag, used on the CE. For example, ATM virtual circuits are identified by an ATM port name, a one-octet virtual path identifier (VPI) that indicates a group of virtual circuits, and a two-octet virtual channel identifier (VCI) in the header of an ATM cell. The VPI/VCI combination is used to identify the next destination of an ATM cell as it passes through a series of ATM switches. In embodiments using the ATM virtual circuit identifier as an arbitrary name for an attachment circuit, the AC ID comprises the ATM port, VPI and VCI. For example, if the ATM port on the router is named "atm1/0" and the VPI is "2" and the VCI is "34," then an appropriate AC ID is "atm1/0.2.34." Since the customer subscribes to the VPN, the customer names for the virtual circuits are appropriate to use as an index into the configuration data stored on the provisioning server.

In some embodiments, the AC ID field 304 holds CE ID data that uniquely identifies a piece of customer premises equipment connected to provider edge equipment. For example, a network access identifier (NAI) or a Domain Name Server (DNS) host name associated with the CE can serve as CE ID data. The use of NAI to indicate a CE is described in RFC 2486 entitled "The Network Access Identifier," by B. Aboba, M. Beadles (January 1999), the entire contents of which are hereby incorporated by reference as if fully set forth herein. The use of DNS to indicate a CE is described in RFC 1101 entitled "DNS encoding of network names and other types," by P. V. Mockapetris (April 1989), the entire contents of which are hereby incorporated by reference as if fully set forth herein. It is assumed for purposes of illustration that CP 150d has an NAI of "corpABC/Twotown@vpnY.domainZ.net." For VPLS or for a CE with a single attachment circuit to a provider edge node, an AC ID value that is only a CE ID value is sufficient to determine VPN membership. For VPWS and a CE with multiple logical or physical attachment circuits to a provider edge, an AC ID includes both a CE ID along with a customer name for a logical attachment circuit to determine a unique identifier for an attachment circuit, and thence VPN membership. Thus, in various embodiments, the AC ID field 304 holds either an AC specific identifier or a CE identifier, or both.

The VC ID field 306 holds data that uniquely indicates a particular collection of pseudo wires on the provider network, e.g., network 110. In a VPLS, the VC ID indicates all the pseudo wires in the VPN, e.g., PWs 140f,140g,140h in VPN 101. In a VPWS, the VC ID indicates a single pseudo wire that provides point-to-point traffic as part of a particular VPN. In some embodiments, the VC ID field 306 holds data that indicates a VPN-ID as described in RFC2685,the entire contents of which are hereby incorporated by references as if fully set forth herein. In some embodiments the VC ID field 306 holds data that indicates a VPN differently from the VPN-ID as described in RFC2685.

In some embodiments, the VC ID serves as an attachment group identifier (AGI) so that each attachment circuit on a VPN can be uniquely identified within the group identifier using an attachment individual identifier (AII).

The AC Service field 308 holds data that describes the service to be provided to an AC or CE. It is based on default values and any specific service properties specified by the customer. In some embodiments, the field 308 includes data that indicates the type of VPN service, e.g., whether the VPN service type is VPLS, VPWS, or IP-only LAN-like Service (IPLS) or some other type of service. In some embodiments a default value indicates VPLS. In some embodiments, the field 308 includes data that indicates attachment circuit specific parameters. Attachment circuit-specific parameter include, but are not limited to: a quality of service level associated with minimum values for bandwidth, and maximum values for latency and jitter; specific values for bandwidth, latency and jitter; an attachment circuit data plane protocol and control plane protocol; authentication credentials; attachment circuit original equipment manufacturer (OEM) signaling; and values for configurable parameters associated with those protocols, such as cell packing for ATM, and maximum transmission unit (MTU) for packet sizes. Default values for all these parameters are defined in some embodiments. For purposes of illustration, it is assumed that in some embodiments AC Service field 308 holds data that indicates a service type of VPLS with Ethernet VLAN protocol for both data and control planes on the attachment circuits, and each attachment circuit allowed up to 30% of bandwidth on a physical port.

FIG. 3B is a block diagram that illustrates a VPN record 320 for configuration data on a subscription server or provisioning server, according to various embodiments. In the illustrated embodiment, the record 320 includes three fields, a Router ID field 302, VC ID field 306, and an Other PE list field 324.

The Router ID field 302 and VC ID field 306 are as described above for the attachment circuit record 300. The value of the Router ID field 302 serves as a primary index, and the value of the VC ID field serves as a secondary index, to a particular VPN record 320 in the data stored on the provisioning server. The Router ID field 302 is omitted and the VC ID field serves as the primary index to the record 320 in some embodiments in which the configuration data is stored on a provider edge node.

The Other PE list field 324 holds data that indicates one or more provider edge nodes to which the edge node identified in Router ID field 302 forms pseudo wires to support the VC indicated in the VC ID field 306. For VPWS, the Other PE list 324 includes an identifier for a single PE different than the PE indicated by the Router ID field 302. In the example VPWS, VPN 100, the Other PE list field 324 for the record with Router ID value 1.1.1.1 (PE 120a) and VC ID corresponding to PW 140a holds data that indicates PE 120c. In the same example, the Other PE list field 324 for the record with Router ID value 1.1.1.3 (PE 120c) holds data that indicates PE 120a. For VPLS, the Other PE list 324 includes identifiers for all PEs on the VPN different from the PE indicated by the Router ID field 302. In the example VPLS, VPN 101, the Other PE list field 324 for the record with Router ID value 1.1.1.1 (PE 120a) and VC ID corresponding to VPN 101 with PWs 140f, 140g, 140h, holds data that indicates PE 120b and PE 120c.

FIG. 3C is a block diagram that illustrates a pseudo wire record 340 on a provisioning server, according to an embodiment. In the illustrated embodiment, the record 340 includes three fields, a Router ID field 302, an Other PE ID field 344, and a pseudo wire (PW) properties field 348.

The Router ID field 302 is as described above for both the attachment circuit record 300 and VPN record 320. The Router ID field 302 serves as a primary index to a particular PW record 340 in the data stored on the subscription server or provisioning server. The Router ID field 302 is omitted in some embodiments in which the configuration data is stored on the provider edge node.

The Other PE ID field 344 holds data that indicates a target provider edge node for a particular pseudo wire. The Other PE ID field 344 serves as a secondary index to a particular PW record 340 in the data stored on the provisioning server. The Other PE field 344 serves as the primary index to the record 320 in some embodiments in which the configuration data is stored on the source provider edge node. In some embodiments, the field 344 includes just an identifier for the router. In some embodiments the field 344 includes also an identifier for a particular attachment circuit on the target router.

The PW properties field 348 holds data that indicate one or more properties of the PW that are used to configure a provider edge node to form the PW. For example, in some embodiments, the PW properties field includes data that indicates a control plane protocol (e.g., the Label Distribution Protocol, LDP, in an MPLS PSN) for negotiating the PW with the target provider edge node. In some embodiments, the PW properties field includes data that indicates a value of an EXP parameter (e.g., a hexadecimal value "3" designated "0x03") as described in RFC3032, cited below, for an MPLS PSN. In some embodiments, the PW properties field 348 includes one or more pairs of attributes and values for PW properties. Default values are defined for all PW properties in some embodiments.

An advantage of the data structures described above with reference to FIG. 3A, FIG. 3B and FIG. 3C, is that they allow the hierarchical relationships between attachment circuits, VPN edge node members and pseudo wires to be represented as flat files used by some provisioning servers, such as RADIUS servers. The configuration data stored in these data structures may be sent to a provider edge node in one or multiple different response messages. Another advantage of these data structures are that they are small and thus can be used to send incremental changes in configuration data to provider edge nodes.

In another embodiment, data for two or more of these data structures are combined into the same data structure on the provisioning server. An advantage of combining these data structures is that fewer operations are required on the provisioning server to retrieve the configuration data. Thus the combined data can be returned in one transaction. A disadvantage of combining these data structures is that data not relevant to a particular edge node and attachment circuit is included in a record and retrieved. Thus, either the server or the receiving provider edge node consumes processing resources to filter out the unwanted information. If the receiving node does the filtering, then extra network resources are consumed to transmit the excess data.

4.0 Method at a Provisioning Server

FIG. 2B is a flow diagram that illustrates at a high level a method 200 for provisioning a virtual private network at a subscription server or provisioning server distinct from a provider edge node, according to an embodiment.

During step 210, configuration data is received at the server and stored. The configuration data indicates values for one or more parameters relevant to configuring one or more attachment circuits to participate in one or more virtual private networks over the provider packet switched network. Any method may be used to receive this configuration data. In some embodiments, the configuration data is retrieved from storage locally or remotely. In some embodiments, the data is sent in a message from another node on the network either in response to a message from the peer requesting the data or in an unsolicited message. In some embodiments a combination of different methods is used.

In the illustrated embodiment, the configuration data is derived based on customer specifications for the topology for the VPN and level of surface obtained when the customer subscribes to the service, as described above in steps 252 and 254 for method 250. In the illustrated embodiment, the configuration data is received and stored at provisioning server 130.

For example, the configuration data indicates for VPN 100 the service is VPWS, the attachment circuits 122 are frame relay virtual circuits, each called a data link connection identifier (DLCI), the participating edge nodes are PEs 120a, 120b, 120c, and PWs 140a, 140b, 140c, 140d, 140e have a certain level of service, e.g., a certain value for a per-hop behavior (PHB) parameter. The use of PHB to indicate level of service is described in RFC 3140 entitled "Per Hop Behavior Identification Codes," by D. Black, S. Brim, B. Carpenter, F. Le Faucheur (June 2001), the entire contents of which are hereby incorporated by reference as if fully set forth herein.

In an alternative example, configuration data is received and stored at provisioning server 130 that indicates for VPN 100 the service is VPWS, the attachment circuits 122b, 122c, 122h, 122j are ATM virtual circuits, the participating edge nodes 120 are PEs 120a, 120b, 120c, with connecting pseudo wires PW 140b and PW 140c that are built on MPLS and have a level of service indicated by a value of an MPLS experimental (EXP) parameter. The use of EXP to indicate level of service is described in RFC 3032 entitled "MPLS Label Stack Encoding" by E. Rosen, D. Tappan, G. Fedorkow, Y. Rekhter, D. Farinacci, T. Li, A. Conta, (January 2001), the entire contents of which are hereby incorporated by reference as if fully set forth herein. RFC 3032 and RFC 3140 are implementations of Differentiated Services Code Point (DSCP) described in RFC 2474 entitled "Definition of the Differentiated Services Field (DS Field) in the IPv4 and IPv6 Headers," by K. Nichols, S. Blake, F. Baker, D. Black (December 1998), the entire contents of which are hereby incorporated by reference as if fully set forth herein.

During step 220, data about the state of the network is received. The network state data may be received in any manner, such as described above for the configuration data. For example, in some embodiments, the configuration data indicates that a particular interface is to join a VPN at a particular time, and the state data simply indicates the current time. In some embodiments, the data about the state of the network is received as a message from a provider edge node, e.g., PE 120, that a particular physical or logical interface on that PE 120 has become active. In some embodiments, the server polls one or more nodes on the provider packet-switched network 110 during step 220 to determine the current state of the network. In some embodiments, the state data is received from a human administrator who indicates when one or more interfaces on a PE should be configured.

In an example of the illustrated embodiment, state data includes information received from a provider edge node.

In step 230, it is determined whether conditions in the network are satisfied to send configuration data to one or more of the provider edge nodes, e.g., PEs 120, based on the data received in step 220. Any conditions may be used to determine when to send the configuration data to the edge nodes. In some embodiments, the current state data is compared against stored state data, and the condition is satisfied when the current state matches the stored state. In some embodiments, the condition is satisfied when a certain message is received from a human administrator, or from a different server, or from a PE 120. For example, in some embodiments, a customer subscribes to a VPN service on the provider's public web site, and the conditions are satisfied when the web site server sends a message to the provisioning server 130 to activate the service.

In an illustrated embodiment, conditions to send configuration data are satisfied when the provider edge node sends a particular message, such as a RADIUS authentication message, to the provisioning server. The particular message indicates that a first data packet is received on an attachment circuit that is not directed to the subscription server and the attachment circuit has an identifier that is included in the stored configuration data. For example, the attachment circuit identifier matches a value in the AC ID field 304 in a record where the requesting provider edge node IP address is in the Router ID field 302.

In step 240, the provisioning server sends configuration data to the provider edge node so that the provider edge node can configure the customer interface to send data over the VPN without human intervention. Thus a human administrator does not touch the provider edge node at the time it is configured to connect an attachment circuit to a VPN. This is called zero touch provisioning.

For example, when the provisioning server 130 is requested to send configuration data to PE 120*c*, provisioning server 130 sends configuration data to PE 120*c*. The configuration data indicates VPWS for VPN 100 with an ATM virtual circuit as attachment circuit 122*j*, switching cells on that virtual circuit with a PW to PE 120*a*, and forming the PW 140*b* with certain properties. The provider edge node then configures the attachment circuit according to the configuration data received.

In a VPLS, the PW (e.g., 140*f*) is likely already established. If the PW is not already established, the PW is set up by having the configuration-receiving PE (e.g., PE 120*c*) send an advertisement to the remote PE (e.g., PE 120*a*), indicating at least an identifier for the set of PEs that make up the VPN. The remote PE (e.g., PE 120*a*) can request further details about that set of PWs from the provisioning server (e.g., server 130), to complete configuration at the remote PE. Using single-sided signaling, the advertisement includes all the data used by the remote PE, so that the remote PE does not query the provisioning server.

In a VPWS, the PW is likely not yet established. The configured PE (e.g., PE 120*c*) then sends an advertisement to the remote PE containing at least a PW identifier. In some embodiments, the advertisement includes an identifier for the AC on the configured PE (e.g., PE 120*c*) sending the advertisement. The remote PE (e.g., PE 120*a*), then either acknowledges the advertisement or stores the advertisement for later acknowledgement. The remote PE (e.g., PE 120*a*) acknowledges the PW (e.g., PW 140*a*) when the remote PE detects an AC on the remote PE that is associated with the same PE (e.g., AC 122*a* associated with PW 140*a*), as indicated by data received at the remote PE (e.g., PE 120*a*) from the provisioning server (e.g., server 130). Using single-sided signaling, the configuration data received by the configured node (e.g., 120*c*) from the provisioning server (e.g., server 130) includes all the data used by the remote PE (such as the AC 122*a* to be associated with the PW 140*a*). All this data is then included in the advertisement so that the remote PE (e.g., 120*a*) obtains the association without querying the provisioning server (e.g., server 130).

There are several advantages of the method 200 compared to the prior art practice. One obvious advantage is that no human intervention is required at the time the conditions are satisfied for doing the configuring. The provisioning information is prepared ahead of time when it is stored on the server and when there is less time pressure and less chance of error. There is also less delay, because the configuration information is available automatically as soon as conditions are satisfied, without having to wait for a human in the process. Also, when a provider edge node is replaced, its configuration data is still available on the server.

By the same token, repeated configuration of the same attachment circuits are accommodated without any additional effort. For example, if the physical interface carrying logical attachment circuits 122*i*,122*j*,122*k* needs to be replaced, the information to configure it is already available on the server. The new physical interface is placed in PE 120*c*, and the server 130 is prompted for the configuration data appropriate for it. Without further human intervention, the desired configuration information is sent from the server 130 to PE1 20*c* and used by PE 120*c* to configure the three logical attachment circuits and their associations with PWs 140*a*, 140*b*, 140*e*. Under prior art practice, the human administrator would have to be involved to manually configure the new interface, either locally or at a remote management tool server and force the new configuration data down to the affected edge nodes.

Another advantage is that only the configuration data for active interfaces are stored and used by the PE 120. For example, if CE 150*b* and CE 150*c* are not yet connected to PE 120*a* and 120*b*, respectively, then the configuration data sent to PE 120*c* is only for attachment circuit 122*k* to PW 140*a* to PE 120*a*. The configuration data for the other attachment circuits 122*i*,122*j* are not sent nor processed at the PE 120*c*. This saves both memory and computational resources at PE 120*c* and the network bandwidth that would be consumed to sent the additional configuration data.

In some embodiments, only the changed configuration data is sent. For example, when CE 150*c* joins VPN 100, only the configuration data for AC 122*i* and PW 140*e* to PE 120*b* is sent to PE 120*c*. This is an advantage over a prior approach in which a large block of commands for configuring every customer interface is sent whenever there is any change. The prior art approach would send configuration data for not only the new AC 122*i*, but also for the AC 122*j* that PE 120*c* already has. The prior art approach thus consumes extra network bandwidth in transmitting the configuration data already in the possession of the receiving node. Furthermore, the prior approach also consumes extra processor resources on the receiving edge node as it causes the receiving edge node to either reconfigure the attachment circuit that is already operating or parses the commands to avoid reconfiguring that attachment circuit. Furthermore, as the extra processing is done, resources are diverted from processing traffic on the attachment circuit.

One prior approach uses a RADIUS server to store data indicating all the provider edge nodes on a given VPN. While the list of other provider edge nodes on a VPN is part of configuration data, providing only this information does not, by itself, alleviate the involvement of a human administrator. In the prior approach, the human administrator still touches each provider edge node to configure it as a member of the VPN and associate the VPN with one or more attachment circuits and to indicate the type of pseudo wire properties to use. Each provider edge node then sends a message to the RADIUS server to indicate that provider edge node's membership in the VPN and to request the names of the other provider edge nodes currently members of the VPN. In some embodiments of this approach, the RADIUS server polls each provider edge node to determine the VPN memberships as set on the provider edge by the human administrator.

In other prior art approaches, a manufacturer-specific command language (e.g., the command line instructions, CLI, of Cisco Systems Inc., San Jose, Calif.) is used to configure attachment circuits for a VPN based on input by a human administrator. In some embodiments of the present invention, an open protocol is used to communicate between server 130 and provider edge nodes, e.g., PEs 120. An advantage of using an open protocol is that open protocol servers are widely deployed and supported. For example, in some embodiments the simple network management protocol (SNMP) is used to exchange messages between provider edge nodes and server 130. In some embodiments, server 130 is a Network Management Server (NMS) that is used or modified to handle the configuration data with SNMP. Other open protocols and corresponding or modified servers may be used to send some or all configuration data between configuration server (e.g., server 130) and provide edge nodes (e.g., PE 120), including but not limited to the Border Gateway Protocol (BGP), the Label Distribution Protocol (LDP), the generic attribute registration protocol (GARP) virtual local area network (VLAN) Registration Protocol (GVRP), and the Resource Reservation Protocol (RSVP).

In some embodiments the Remote Authentication Dial-In User Service (RADIUS) protocol is used to exchange configuration data and a RADIUS server is used or modified to perform some or all of the functions of subscription server 135 and provisioning server 130.

5.0 Method at Provider Edge for Provisioning a VPN

Figure 4:
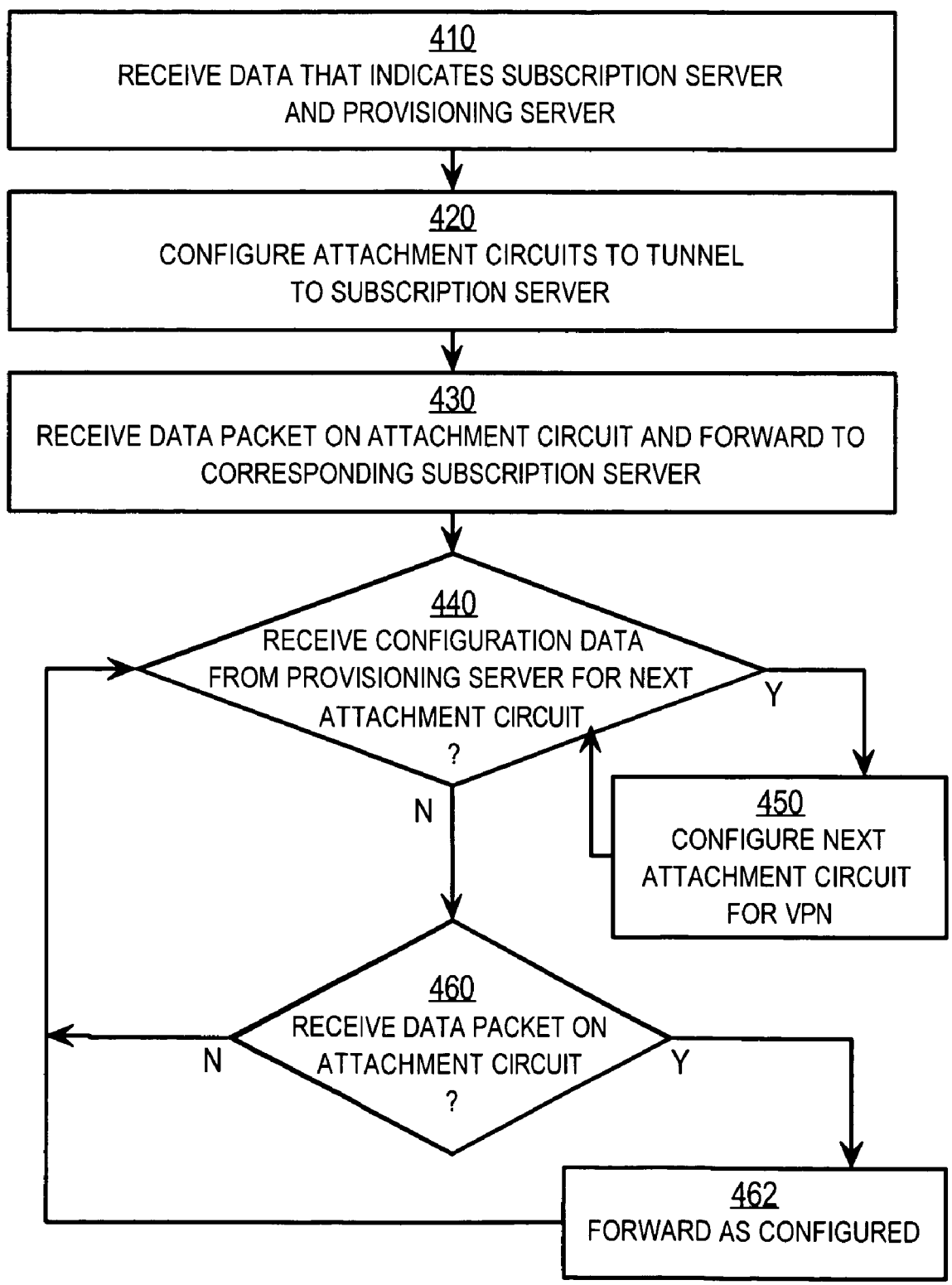
FIG. 4 is a flow diagram that illustrates at a high level a method for provisioning a virtual private network at a provider edge node, according to an embodiment.

FIG. 4 is a flow diagram that illustrates at a high level a method 400 for provisioning a virtual private network at a provider edge node, according to an embodiment.

In step 410, data is received at the provider edge node that indicates a subscription server and a provisioning server. Any method may be used to receive this data, as described above with reference to step 252 for receiving customer input data. In some embodiments, in which provisioning information is pushed to each provider edge node without a request from the provider edge node, step 410 excludes data that indicates the provisioning server.

In step 420, one or more attachment circuits on the provider edge node are configured to tunnel all traffic to the subscription server host. In some embodiments, only HTTP application layer (layer 7) traffic is forwarded in the tunnel to the subscription server host, while other types of data packets are ignored, and the attachment circuit so configured is a "captive portal." The subscription server host in such embodiments typically includes an HTTP server acting as the subscription server itself or an agent for the subscription server. In other embodiments, the subscription server or an agent for the subscription server is designed to handle one or more other protocols above the link layer, and these protocols are also forwarded through the tunnel to the subscription server.

In various other embodiments, various authentication protocols for various layers may be used to engage the subscription server host or an agent for the subscription server. Further traffic on the attachment circuit is ignored until authentication is received. Authentication is offered by the subscription server, or its agent, if sufficient customer input, such as payment information, is received for the corresponding attachment circuit. In some embodiments the authentication message includes the configuration data for the attachment circuit.

Any authentication protocol known in the art may be used. Other authentication protocols, currently well known in the art, which can be used to direct traffic on an attachment circuit only to the subscription server include, but are not limited to the following:

Point-to-Point Protocol (PPP)
Extensible Authentication Protocol (EAP)
IEEE 802.1X
Protocol for carrying Authentication and Network Access (PANA)
Cisco Discovery Protocol (CDP)
HTTP Identity Proxy (HIP).

In some of these embodiments the subscription server executes on the provider edge node to interpret data packets received on the attachment circuit. Many of the other well-known authentication protocols listed above are suitable for a subscription server that is located on the same edge node that is interfacing with the customer premises equipment.

In an illustrated embodiment, provider edge node 120*a* includes Ethernet media ports, FR media ports and ATM media ports. All the ports are initially configured during step 420 to send HTTP data packets to subscription server 135 and to not forward any other data packet traffic. In effect, this creates the default PW 136 for HTTP traffic.

In step 430, a data packet is received on one of the attachment circuits which are tunneled to the subscription server. The data packet is forwarded to the subscription server for interpretation.

In an illustrated embodiment, HTTP data packets arrive at PE 120*a* on a particular ATM media port (e.g., the physical attachment circuit that carries logical AC 122*a* and logical AC 122*b*) from CE 150*a*. The ATM payloads are stripped off and packaged in TCP/IP data packets directed to subscription server 135. TCP/IP indicates data packets using the Transmission Control Protocol (TCP, a layer 4 protocol) over the Internet Protocol (IP, a layer 3 protocol). Return HTTP data packets from subscription server 135 directed to the particular ATM port are extracted from TCP/IP payloads and loaded into ATM payloads and placed on the attachment circuit. No other ATM payloads are forwarded. This allows the subscription server 135 to communicate with a Web browser on CE 150a to obtain customer input for subscribing to VPN service. It is assumed for purposes of illustration that the customer provides the information indicated in Table 1 to the subscription server 135 during this exchange. In some embodiments, when sufficient customer input is received, the subscription server notifies the customer that the customer can begin sending data packets according to the subscribed service.

As another example, in some embodiments, a data packet arrives on one of these attachment circuits and is forwarded in a PPP tunnel to the host for the subscription server for authentication. PPP data packets are exchanged in a manner similar to the exchange of username and password in more common authentication processes until the subscription server is satisfied that sufficient customer input has been received to derive configuration data for one or more attachment circuits, which may include the attachment circuit on the PPP tunnel. If the data packet sent through the PPP tunnel makes no sense to the subscription server, then the data packet is ignored and no progress is made in configuring any attachment circuit. When sufficient customer input has been received, the PPP packets from the subscription server stop. In some embodiments, a final PPP data packet from the subscription server notifies the customer that the customer can begin using one or more of the attachment circuits supported by the subscription input.

In some embodiments, data packets not directed to the subscription server or its host are not ignored. Instead, each is examined to pick out attachment circuit identifiers. For example, the data packet received on the ATM media port is examined to determine an ATM virtual circuit identifier. The attachment circuit identifier is then sent in an authentication request message to the provisioning server 130 to obtain configuration data for the virtual circuit. Before sufficient customer input is transmitted to the subscription server, however, there is not enough configuration data for that attachment circuit. Thus, at least initially, provisioning server 130 does not send authentication for the attachment circuit. In the illustrated embodiment, initially there is not enough configuration data for the ATM virtual circuit and PE 120a does not forward such non-HTTP traffic. In some embodiments, the data packets for such other traffic are stored for transmission after the corresponding attachment circuit is configured. In some embodiments, data packets for such other traffic are simply dropped.

When conditions for sending the configuration data to a provider edge node are satisfied, the configuration data is sent to the provider edge node, as described above in step 230 of method 200. For example, a data packet received on the ATM media port is examined to determine an ATM virtual circuit identifier, e.g., "2.34." The virtual circuit identifier is then sent in an authentication request message to the provisioning server 130 to obtain configuration data for the virtual circuit. Now there is enough configuration data for that virtual circuit; and the provisioning server 130 sends an authentication message with configuration data for ATM virtual circuit "2.34."

In step 440 it is determined whether configuration data is received at the provider edge node from a provisioning server for an attachment circuit. For example, it is determined in step 440 whether configuration data is received at PE 120a from provisioning server 130. Any method may be used to receive the configuration data. In some embodiments the configuration data is received in one or more authentication messages from an authentication server, such as in a RADIUS authentication message from a RADIUS server or a PPP authentication message over a PPP tunnel to the provisioning server. If configuration data is received, control passes to step 450; otherwise control passes to step 460.

In step 450, an attachment circuit is configured without human intervention to join a VPN based on the configuration data received. For example, AC 122b is configured based on that configuration data to join VPN 100 by switching its traffic through PW 140d to PE 120b and AC 122h. Control then passes back to step 440 to determine whether more configuration data is received.

If configuration data is not received control passes to step 460 to determine whether traffic is received on one of the attachment circuits. If not, control passes back to steps 440 and 460 to determine what kind of traffic is received. If it is determined in step 460 that a data packet is received on an attachment circuit, then control passes to step 462.

In step 462 the traffic is forwarded as configured. If the attachment circuit is still initially configured to forward only certain protocol traffic to the subscription server, then only that type of traffic is forwarded to that server, but no other traffic is forwarded. For example, if the attachment circuit is still initially configured to forward only HTTP traffic to the subscription server, then HTTP traffic is forwarded to that server, but no other traffic is forwarded. If the attachment circuit has been configured to join a VPN by switching traffic to one or more pseudo wires, then the data packet is forwarded to the corresponding one or more pseudo wires. Control then passes to steps 440 and 460 to determine the next data received.

In some embodiments, step 462 includes a step to request configuration data for an attachment circuit. For example, if the traffic is non-HTTP traffic on an attachment circuit still initially configured to forward only HTTP traffic to the subscription server, then the data packet is examined to determine an attachment circuit identifier. The identifier is then sent to the provisioning server to request configuration data for the corresponding attachment circuit. If sufficient customer input has been received to form the configuration data for that attachment circuit, then the provisioning server sends the configuration data. The configuration data is detected in step 440 and used to configure the attachment circuit in step 450, described above.

In some embodiments, all attachment circuits oh all provider edge nodes are initially configured to send certain protocol traffic to one or more subscription servers. Then any customer may connect any CE to an appropriate media port as a first attachment circuit on the PE and communicate with the subscription server using the designated protocol. After that exchange, one or more attachment circuits on one or more provider edge nodes, including the first attachment circuit or not, is joined to the VPN subscribed to. In some embodiments, only certain attachment circuits are configured to communicate with the one or more subscription servers using the certain protocol, and the customer must connect to the provider edge node using one of those attachment circuits.

Thus, attachment circuits are configured to join to a VPN based purely on customer inputs, without human intervention by the provider.

6.0 Implementation Mechanisms—Hardware Overview

FIG. 5 is a block diagram that illustrates a computer system 500 upon which an embodiment of the invention may be implemented. The preferred embodiment is implemented using one or more computer programs running on a network element such as a router device. Thus, in this embodiment, the computer system 500 is a router.

Computer system 500 includes a communication mechanism such as a bus 510 for passing information between other internal and external components of the computer system 500. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0,1 w) of a binary digit (bit). A sequence of binary digits constitutes digital data that is used to represent a number or code for a character. A bus 510 includes many parallel conductors of information so that information is transferred quickly among devices coupled to the bus 510. One or more processors 502 for processing information are coupled with the bus 510. A processor 502 performs a set of operations on information. The set of operations include bringing information in from the bus 510 and placing information on the bus 510. The set of operations also typically include comparing two or more units of information, shifting positions of units of information, and combining two or more units of information, such as by addition or multiplication. A sequence of operations to be executed by the processor 502 constitute computer instructions.

Computer system 500 also includes a memory 504 coupled to bus 510. The memory 504, such as a random access memory (RAM) or other dynamic storage device, stores information including computer instructions. Dynamic memory allows information stored therein to be changed by the computer system 500. RAM allows a unit of information stored at a location called a memory address to be stored and retrieved independently of information at neighboring addresses. The memory 504 is also used by the processor 502 to store temporary values during execution of computer instructions. The computer system 500 also includes a read only memory (ROM) 506 or other static storage device coupled to the bus 510 for storing static information, including instructions, that is not changed by the computer system 500. Also coupled to bus 510 is a non-volatile (persistent) storage device 508, such as a magnetic disk or optical disk, for storing information, including instructions, that persists even when the computer system 500 is turned off or otherwise loses power.

The term computer-readable medium is used herein to refer to any medium that participates in providing information to processor 502, including instructions for execution. Such a medium may take many forms, including, but not limited to, non-volatile media, volatile media and transmission media. Non-volatile media include, for example, optical or magnetic disks, such as storage device 508. Volatile media include, for example, dynamic memory 504. Transmission media include, for example, coaxial cables, copper wire, fiber optic cables, and waves that travel through space without wires or cables, such as acoustic waves and electromagnetic waves, including radio, optical and infrared waves. Signals that are transmitted over transmission media are herein called carrier waves.

Common forms of computer-readable media include, for example, a floppy disk, a flexible disk, a hard disk, a magnetic tape or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read.

Information, including instructions, is provided to the bus 510 for use by the processor from an external terminal 512, such as a terminal with a keyboard containing alphanumeric keys operated by a human user, or a sensor. A sensor detects conditions in its vicinity and transforms those detections into signals compatible with the signals used to represent information in computer system 500. Other external components of terminal 512 coupled to bus 510, used primarily for interacting with humans, include a display device, such as a cathode ray tube (CRT) or a liquid crystal display (LCD) or a plasma screen, for presenting images, and a pointing device, such as a mouse or a trackball or cursor direction keys, for controlling a position of a small cursor image presented on the display and issuing commands associated with graphical elements presented on the display of terminal 512. In some embodiments, terminal 512 is omitted.

Computer system 500 also includes one or more instances of a communications interface 570 coupled to bus 510. Communication interface 570 provides a two-way communication coupling to a variety of external devices that operate with their own processors, such as printers, scanners, external disks, and terminal 512. Firmware or software running in the computer system 500 provides a terminal interface or character-based command interface so that external commands can be given to the computer system. For example, communication interface 570 may be a parallel port or a serial port such as an RS-232 or RS-422 interface, or a universal serial bus (USB) port on a personal computer. In some embodiments, communications interface 570 is an integrated services digital network (ISDN) card or a digital subscriber line (DSL) card or a telephone modem that provides an information communication connection to a corresponding type of telephone line. In some embodiments, a communication interface 570 is a cable modem that converts signals on bus 510 into signals for a communication connection over a coaxial cable or into optical signals for a communication connection over a fiber optic cable. As another example, communications interface 570 may be a local area network (LAN) card to provide a data communication connection to a compatible LAN, such as Ethernet. Wireless links may also be implemented. For wireless links, the communications interface 570 sends and receives electrical, acoustic or electromagnetic signals, including infrared and optical signals, which carry information streams, such as digital data. Such signals are examples of carrier waves In the illustrated embodiment, special purpose hardware, such as an application specific integrated circuit (IC) 520, is coupled to bus 510. The special purpose hardware is configured to perform operations not performed by processor 502 quickly enough for special purposes. Examples of application specific ICs include graphics accelerator cards for generating images for display, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

In the illustrated computer used as a router, the computer system 500 includes switching system 530 as special purpose hardware for switching information for flow over a network. Switching system 530 typically includes multiple communications interfaces, such as communications interface 570, for coupling to multiple other devices. In general, each coupling is with a network link 532 that is connected to another device in or attached to a network, such as local network 580 in the illustrated embodiment, to which a variety of external devices with their own processors are connected. In some embodiments an input interface or an output interface or both are linked to each of one or more external network elements. Although three network links 532a, 532b, 532c are included in network links 532 in the illustrated embodiment, in other embodiments, more or fewer links are connected to switching system 530. Network links 532 typically provides information communication through one or more networks to other devices that use or process the information. For example, network link 532b may provide a connection through local network 580 to a host computer 582 or to equipment 584 operated by an Internet Service Provider (ISP). ISP equipment 584 in turn provides data communication services through the public, world-wide packet-switching communication network of networks now commonly referred to as the Internet 590. A computer called a server 592 connected to the Internet provides a service in response to information received over the Internet. For example, server 592 provides routing information for use with switching system 530.

The switching system 530 includes logic and circuitry configured to perform switching functions associated with passing information among elements of network 580, including passing information received along one network link, e.g. 532a, as output on the same or different network link, e.g., 532c. The switching system 530 switches information traffic arriving on an input interface to an output interface according to pre-determined protocols and conventions that are well known. In some embodiments, switching system 530 includes its own processor and memory to perform some of the switching functions in software. In some embodiments, switching system 530 relies on processor 502, memory 504, ROM 506, storage 508, or some combination, to perform one or more switching functions in software. For example, switching system 530, in cooperation with processor 504 implementing a particular protocol, can determine a destination of a packet of data arriving on input interface on link 532a and send it to the correct destination using output interface on link 532c. The destinations may include host 582, server 592, other terminal devices connected to local network 580 or Internet 590, or other routing and switching devices in local network 580 or Internet 590.

The invention is related to the use of computer system 500 for implementing the techniques described herein. According to one embodiment of the invention, those techniques are performed by computer system 500 in response to processor 502 executing one or more sequences of one or more instructions contained in memory 504. Such instructions, also called software and program code, may be read into memory 504 from another computer-readable medium such as storage device 508. Execution of the sequences of instructions contained in memory 504 causes processor 502 to perform the method steps described herein. In alternative embodiments, hardware, such as application specific integrated circuit 520 and circuits in switching system 530, may be used in place of or in combination with software to implement the invention. Thus, embodiments of the invention are not limited to any specific combination of hardware and software.

The signals transmitted over network link 532 and other networks through communications interfaces such as interface 570, which carry information to and from computer system 500, are exemplary forms of carrier waves. Computer system 500 can send and receive information, including program code, through the networks 580, 590 among others, through network links 532 and communications interfaces such as interface 570. In an example using the Internet 590, a server 592 transmits program code for a particular application, requested by a message sent from computer 500, through Internet 590, ISP equipment 584, local network 580 and network link 532b through communications interface in switching system 530. The received code may be executed by processor 502 or switching system 530 as it is received, or may be stored in storage device 508 or other non-volatile storage for later execution, or both. In this manner, computer system 500 may obtain application program code in the form of a carrier wave.

Various forms of computer readable media may be involved in carrying one or more sequence of instructions or data or both to processor 502 for execution. For example, instructions and data may initially be carried on a magnetic disk of a remote computer such as host 582. The remote computer loads the instructions and data into its dynamic memory and sends the instructions and data over a telephone line using a modem. A modem local to the computer system 500 receives the instructions and data on a telephone line and uses an infra-red transmitter to convert the instructions and data to an infra-red signal, a carrier wave serving as the network link 532b. An infrared detector serving as communications interface in switching system 530 receives the instructions and data carried in the infrared signal and places information representing the instructions and data onto bus 510. Bus 510 carries the information to memory 504 from which processor 502 retrieves and executes the instructions using some of the data sent with the instructions. The instructions and data received in memory 504 may optionally be stored on storage device 508, either before or after execution by the processor 502 or switching system 530.

3.0 Extensions and Alternatives

In this specification and Appendix, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for configuring a network interface on an intermediate network node at an edge of a provider network to support a virtual private network, comprising the steps of:

receiving, without intervention by a service provider, customer input data that indicates, for a particular virtual private network over a provider network of the service provider, a topology for a plurality of customer equipment devices outside the provider network to be joined on the particular virtual private network;

based on the customer input data, determining configuration data without intervention by the service provider for configuring a particular interface of a particular edge node among a plurality of interfaces that connect the plurality of customer equipment devices to a plurality of edge nodes at an edge of the provider network for the particular virtual private network, wherein the particular interface is configured to direct HyperText Transfer Protocol (HTTP) data packets to the subscription server and to not forward other types of data packets; and causing the particular edge node to configure the particular interface based on the configuration data without intervention by the service provider, wherein packets are switched with attachment circuits at the particular edge node through a default pseudo wire associated with a subscription server until the attachment circuits are configured to join the particular virtual private network.

2. A method as recited in claim 1, said step of receiving customer input data further comprising receiving a plurality of properties for the plurality of interfaces that connect the plurality of customer equipment devices to the plurality of edge nodes.

3. A method as recited in claim 1, said step of receiving customer input data further comprising receiving the customer input data at a World Wide Web server accessed through a public Internet.

4. A method as recited in claim 1, said step of receiving customer input data that indicates the topology further comprising:
    sending a prompt message to a customer device that prompts the customer to enter a type of VPN service; and
    receiving input data that indicates the type of VPN in response to sending the message.

5. A method as recited in claim 2, said step of receiving customer input data that indicates the plurality of properties further comprising:
    sending a prompt message to a customer device that prompts the customer to enter a unique identifier for the particular interface; and
    receiving input data that indicates the unique identifier for the particular interface in response to sending the message.

6. A method as recited in claim 1, said step of receiving customer input data that indicates the topology further comprising:
    sending a prompt message to a customer device that prompts the customer to enter a unique identifier for each customer equipment device of the plurality of customer equipment devices; and
    receiving input data that indicates the unique identifier for each customer equipment device in response to sending the message.

7. A method as recited in claim 1, said step of receiving customer input data that indicates the plurality of properties further comprising:
    sending a prompt message to a customer device that prompts the customer to enter a level of service for a tunnel between two customer equipment devices of the plurality of customer equipment devices; and
    receiving input data that indicates the level of service for a tunnel between two customer equipment devices in response to sending the message.

8. A method as recited in claim 1, said step of receiving customer input data that indicates the plurality of property further comprising:
    sending a prompt message to a customer device that prompts the customer to enter data that indicates a network protocol for the particular interface; and
    receiving input data that indicates the network protocol for the particular interface in response to sending the message.

9. A method as recited in claim 8, said step of receiving customer input data that indicates the plurality of properties further comprising:
    sending a prompt message to a customer device that prompts the customer to enter data that indicates a value for a parameter for the network protocol for the particular interface; and
    receiving input data that indicates the value for the parameter for the network protocol for the particular interface in response to sending the message.

10. A method as recited in claim 1, wherein the particular interface is a virtual circuit of a plurality of virtual circuits on the same physical circuit.

11. A method as recited in claim 1, wherein the particular interface is a physical circuit.

12. A method as recited in claim 1, said step of determining configuration data further comprising determining a mapping between a customer identification for the particular interface and a particular virtual private network.

13. A method as recited in claim 1, said step of determining configuration data further comprising determining values for service parameters that are specific to the particular interface.

14. A method as recited in claim 1, said step of determining configuration data further comprising determining values for the type of virtual private network among a plurality of types that include at least two of a virtual private wire service (VPWS), a virtual private local area network service (VPLS) and an inter-local access and transport area private line service (IPLS).

15. A method as recited in claim 1, said step of determining configuration data further comprising determining a mapping between the particular virtual private network and a different node on the edge of the provider network to which the particular node should establish a tunnel for the particular private network.

16. A method as recited in claim 1, said step of determining configuration data further comprising determining a property for a tunnel for the particular private network from the particular node to a different node on an edge of the provider network from a plurality of properties that include at least one of a name for the tunnel and a service level for traffic through the tunnel.

17. A method as recited in claim 1, said step of causing the particular node to configure the particular interface further comprising the steps of:
    storing the configuration data;
    determining whether conditions are satisfied for sending the configuration data to the particular node; and
    if it is determined that conditions are satisfied for sending the configuration data, then sending the configuration data to the particular node to cause the particular node to configure the particular interface without intervention for the particular virtual private network based on the configuration data.

18. A method as recited in claim 1, said step of causing the particular node to configure the particular interface further comprising the step of sending the configuration data to a provisioning server on a lost computer on the provider network, which host computer is different from the particular node, wherein the provisioning server performs the steps of:
    storing the configuration data;
    determining whether conditions are satisfied for sending the configuration data to the particular node; and
    if it is determined that conditions are satisfied for sending the configuration data, then sending the configuration data to the particular node to cause the particular node to configure the particular interface without intervention for the particular virtual private network based on the configuration data.

19. A method as recited in claim 18, wherein the provisioning server is a Remote Access Dial-In Service (RADIUS) Server.

20. A method as recited in claim 19, said step of determining whether conditions are satisfied for sending the configuration data further comprising determining whether a RADIUS user authentication request message is received from the particular node, which request includes a RADIUS user name attribute with data that indicates the particular interface.

21. A method for configuring a network interface on an intermediate network node at an edge of a provider network to support a virtual private network, comprising the steps of:
    receiving data that indicates a subscription server on a provider network of a service provider;

configuring a first attachment circuit on a particular edge node of a plurality of attachment circuits for connection to customer equipment outside the provider network on a plurality of edge nodes at an edge of the provider network to exchange data packets for a particular protocol with the subscription server;

receiving on the first attachment circuit a data packet that uses the particular protocol and includes at least a portion of customer input data that indicates, for a particular virtual private network over the provider network, a topology for a plurality of customer equipment devices outside the provider network to be joined on a particular virtual private network;

forwarding the data packet to the subscription server;

receiving configuration data based on the customer input data; and configuring a second attachment circuit on the particular edge node to join the particular virtual private network without intervention based on the configuration data;

wherein packets are switched with attachment circuits at the particular edge node through a default pseudo wire associated with a subscription server until the attachment circuits are configured to join the particular virtual private network, wherein a particular interface of the particular edge node is configured to direct HTTP data packets to the subscription server and to not forward other types of data packets.

22. A method as recited in claim 21, wherein the second attachment circuit is the same as the first attachment circuit.

23. A method as recited in claim 21, wherein the second attachment circuit is a physical circuit.

24. A method as recited in claim 21, wherein the second attachment circuit is a virtual circuit of a plurality of virtual circuits on the same physical circuit.

25. A method as recited in claim 21, said step of receiving the configuration data further comprising receiving the configuration data from a provisioning server different from the subscription server.

26. A method as recited in claim 21, wherein the particular protocol is a HyperText Transfer Protocol (HTTP).

27. An apparatus for configuring a network interface on an intermediate network node at an edge of a provider network to support a virtual private network, comprising:

means for receiving, without intervention by a service provider, customer input data that indicates, for a particular virtual private network over a provider network of the service provider, a topology for a plurality of customer equipment devices outside the provider network to be joined on the particular virtual private network;

means for determining without intervention by the service provider, based on the customer input data, configuration data for configuring a particular interface of a particular edge node among a plurality of interfaces that connect the plurality of customer equipment devices to a plurality of edge nodes at an edge of the provider network for the particular virtual private network, wherein the particular interface is configured to direct HTTP data packets to the subscription server and to not forward other types of data packets; and means for causing the particular edge node to configure the particular interface based on the configuration data without intervention by the service provider, wherein packets are switched with attachment circuits at the particular edge node through a default pseudo wire associated with a subscription server until the attachment circuits are configured to join the particular virtual private network.

28. An apparatus for configuring a network interface on an intermediate network node at an edge of a provider network to support a virtual private network, comprising:

means for receiving data that indicates a subscription server on a provider network of a service provider, means for configuring a first attachment circuit on a particular edge node of a plurality of attachment circuits for connection to customer equipment outside the provider network on a plurality of edge nodes at an edge of the provider network to exchange data packets for a particular protocol with the subscription server, means for receiving on the first attachment circuit a data packet that uses the particular protocol and includes at least a portion of customer input data that indicates, for a particular virtual private network over the provider network, a topology for a plurality of customer equipment devices outside the provider network to be joined on a particular virtual private network;

means for forwarding the data packet to the subscription server;

means for receiving configuration data based on the customer input data; and means for configuring a second attachment circuit on the particular edge node to join the particular virtual private network without intervention based on the configuration data, wherein a particular interface of the particular edge node is configured to direct HTTP data packets to the subscription server and to not forward other types of data packets, wherein packets are switched with attachment circuits at the particular edge node through a default pseudo wire associated with a subscription server until the attachment circuits are configured to join the particular virtual private network.

29. An apparatus for configuring a network interface on an intermediate network node at an edge of a provider network of a service provider to support a virtual private network, comprising:

a network interface that is coupled to a provider network for communicating therewith a data packet;

one or more processors;

a computer-readable medium; and one or more sequences of instructions stored in the computer readable medium, which, when executed by the one or more processors, causes the one or more processors to carry out the step of:

receiving, without intervention by a service provider, customer input data that indicates, for a particular virtual private network over a provider network of the service provider, a topology for a plurality of customer equipment devices outside the provider network to be joined on the particular virtual private network;

based on the customer input data, determining, without intervention by the service provider, configuration data for configuring a particular interface of a particular edge node among a plurality of interfaces that connect the plurality of customer equipment devices to a plurality of edge nodes at an edge of the provider network for the particular virtual private network, wherein the particular interface is configured to direct HTTP data packets to the subscription server and to not forward other types of data packets; and causing the particular edge node to configure the particular interface based on the configuration data without intervention by the service provider, wherein packets are switched with attachment circuits at the particular edge node through a default pseudo wire associated with a subscription server until the attachment circuits are configured to join the particular virtual private network.

30. An apparatus as recited in claim 29, said step of receiving customer input data further comprising receiving a plurality of properties for the plurality of interfaces that connect the plurality of customer equipment devices to the plurality of edge nodes.

31. An apparatus as recited in claim 29, said step of receiving customer input data further comprising receiving the customer input data at a World Wide Web server accessed through a public Internet.

32. An apparatus as recited in claim 29, said step of receiving customer input data further comprising causing the particular node to configure the particular interface to switch a data packet of a particular protocol received on the particular interface to a subscription server that uses the particular protocol for prompting the customer for the customer input data.

33. An apparatus as recited in claim 29, said step of receiving customer input data that indicates the topology further comprising:
  sending a prompt message to a customer device that prompts the customer to enter a type of VPN service; and
  receiving input data that indicates the type of VPN in response to sending the message.

34. An apparatus as recited in claim 30, said step of receiving customer input data that indicates the plurality of properties further comprising:
  sending a prompt message to a customer device that prompts the customer to enter a unique identifier for the particular interface; and
  receiving input data that indicates the unique identifier for the particular interface in response to sending the message.

35. An apparatus as recited in claim 29, said step of receiving customer input data that indicates the topology further comprising:
  sending a prompt message to a customer device that prompts the customer to enter a unique identifier for each customer equipment device of the plurality of customer equipment devices; and
  receiving input data that indicates the unique identifier for each customer equipment device in response to sending the message.

36. An apparatus as recited in claim 29, said step of receiving customer input data that indicates the plurality of properties further comprising:
  sending a prompt message to a customer device that prompts the customer to enter a level of service for a tunnel between two customer equipment devices of the plurality of customer equipment devices; and
  receiving input data that indicates the level of service for a tunnel between two customer equipment devices in response to sending the message.

37. An apparatus as recited in claim 29, said step of receiving customer input data that indicates the plurality of properties further comprising:
  sending a prompt message to a customer device that prompts the customer to enter data that indicates a network protocol for the particular interface; and
  receiving input data that indicates the network protocol for the particular interface in response to sending the message.

38. An apparatus as recited in claim 37, said step of receiving customer input data that indicates the plurality of properties further comprising:
  sending a prompt message to a customer device that prompts the customer to enter data that indicates a value for a parameter for the network protocol for the particular interface; and
  receiving input data that indicates the value for the parameter for the network protocol for the particular interface in response to sending the message.

39. An apparatus as recited in claim 29, wherein the particular interface is a virtual circuit of a plurality of virtual circuits on the same physical circuit.

40. An apparatus as recited in claim 29, wherein the particular interface is a physical circuit.

41. An apparatus as recited in claim 29, said step of determining configuration data further comprising determining a mapping between a customer identification for the particular interface and a particular virtual private network.

42. An apparatus as recited in claim 29, said step of determining configuration data further comprising determining values for service parameters that are specific to the particular interface.

43. An apparatus as recited in claim 29, said step of determining configuration data further comprising determining values for the type of virtual private network among a plurality of types that include at least two of a virtual private wire service (VPWS), a virtual private local area network service (VPLS) and an inter-local access and transport area private line service (IPLS).

44. An apparatus as recited in claim 29, said step of determining configuration data further comprising determining a mapping between the particular virtual private network and a different node on the edge of the provider network to which the particular node should establish a tunnel for the particular private network.

45. An apparatus as recited in claim 29, said step of determining configuration data further comprising determining a property for a tunnel for the particular private network from the particular node to a different node on an edge of the provider network from a plurality of properties that include at least one of a name for the tunnel and a service level for traffic through the tunnel.

46. An apparatus as recited in claim 29, said step of causing the particular node to configure the particular interface further comprising the steps of:
  storing the configuration data;
  determining whether conditions are satisfied for sending the configuration data to the particular node; and
  if it is determined that conditions are satisfied for sending the configuration data, then sending the configuration data to the particular node to cause the particular node to configure the particular interface without intervention for the particular virtual private network based on the configuration data.

47. An apparatus as recited in claim 29, said step of causing the particular node to configure the particular interface further comprising the step of sending the configuration data to a provisioning server on a host computer on the provider network, which host computer is different from the particular node, wherein the provisioning server performs the steps of:
  storing the configuration data;
  determining whether conditions are satisfied for sending the configuration data to the particular node; and
  if it is determined that conditions are satisfied for sending the configuration data, then sending the configuration data to the particular node to cause the particular node to configure the particular interface without intervention for the particular virtual private network based on the configuration data.

48. An apparatus as recited in claim 47, wherein the provisioning server is a Remote Access Dial-In Service (RADIUS) Server.

49. An apparatus as recited in claim 48, said step of determining whether conditions are satisfied for sending the configuration data further comprising determining whether a RADIUS user authentication request message is received from the particular node, which request includes a RADIUS user name attribute with data that indicates the particular interface.

50. An apparatus for configuring a network interface on an intermediate network node at an edge of a provider network to support a virtual private network, comprising:
   a provider network interface that is coupled to a provider network for communicating therewith a data packet;
   a customer network interface for coupling to customer premises equipment outside the provider network for communicating therewith a data packet;
   one or more processors;
   a computer-readable medium; and
   one or more sequences of instructions stored in the computer-readable medium, which, when executed by the one or more processors, causes the one or more processors to carry out the step of:
      receiving data that indicates a subscription server on a provider network of a service provider,
      configuring a first attachment circuit on the customer network interface to exchange data packets for a particular protocol with the subscription server;
      receiving on the first attachment circuit a data packet that uses the particular protocol and includes at least a portion of customer input data that indicates, for a particular virtual private network over the provider network, a topology for a plurality of customer equipment devices outside the provider network to be joined on a particular virtual private network;
      forwarding the data packet to the subscription server;
      receiving configuration data based on the customer input data; and
      configuring a second attachment circuit for coupling to customer premises equipment to join the particular virtual private network without intervention based on the configuration data,
      wherein packets are switched with attachment circuits at a particular edge node through a default pseudo wire associated with a subscription server until the attachment circuits are configured to join the particular virtual private network wherein a particular interface of the particular edge node is configured to direct HTTP data packets to the subscription server and to not forward other types of data packets.

51. An apparatus as recited in claim 50, wherein the second attachment circuit is the same as the first attachment circuit.

52. An apparatus as recited in claim 50, wherein the second attachment circuit is a physical circuit.

53. An apparatus as recited in claim 50, wherein the second attachment circuit is a virtual circuit of a plurality of virtual circuits on the same physical circuit.

54. An apparatus as recited in claim 50, said step of receiving the configuration data further comprising receiving the configuration data from a provisioning server different from the subscription server.

55. An apparatus as recited in claim 50, wherein the particular protocol is a HyperText Transfer Protocol (HTTP).

* * * * *